US010642918B2

(12) United States Patent
Sahni et al.

(10) Patent No.: US 10,642,918 B2
(45) Date of Patent: May 5, 2020

(54) EFFICIENT PUBLISH/SUBSCRIBE SYSTEMS

(71) Applicant: UNIVERSITY OF FLORIDA RESEARCH FOUNDATION, INCORPORATED, Gainesville, FL (US)

(72) Inventors: Sartaj K. Sahni, Gainesville, FL (US); Tania Banerjee, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 623 days.

(21) Appl. No.: 14/212,107

(22) Filed: Mar. 14, 2014

(65) Prior Publication Data

US 2014/0280317 A1   Sep. 18, 2014

Related U.S. Application Data

(60) Provisional application No. 61/788,333, filed on Mar. 15, 2013.

(51) Int. Cl.
*G06F 16/958* (2019.01)
(52) U.S. Cl.
CPC .................................. *G06F 16/958* (2019.01)
(58) Field of Classification Search
CPC ............ G06F 17/3089; G06F 21/6227; G06F 17/30961; G06F 21/604; G06F 16/2246; G06F 16/282; G06F 40/14
USPC ........ 707/628, 778, 786, 829, 797, 730, 750
See application file for complete search history.

(56) References Cited

U.S. PATENT DOCUMENTS

| 5,778,371 | A | * | 7/1998 | Fujihara | ............ | G06F 17/30985 |
| 5,778,430 | A | * | 7/1998 | Ish | .................. | G06F 12/123 |
| | | | | | | 711/113 |
| 5,911,776 | A | * | 6/1999 | Guck | ................ | G06F 17/30569 |
| | | | | | | 707/999.104 |
| 6,535,855 | B1 | * | 3/2003 | Cahill | ................ | G06Q 30/0281 |
| | | | | | | 340/540 |
| 6,865,567 | B1 | * | 3/2005 | Oommen | .......... | G06F 17/30463 |
| 7,483,871 | B2 | * | 1/2009 | Herz | ................ | G06F 17/30867 |
| 9,201,982 | B2 | * | 12/2015 | Lin | .................... | G06F 17/30961 |
| 2003/0120429 | A1 | * | 6/2003 | Li | ............................ | G06F 19/22 |
| | | | | | | 702/19 |

(Continued)

OTHER PUBLICATIONS

Pereira, J., et al., "Efficient Matching for Web-Based Publish/Subscribe Systems," Cooperative Information Systems, Lecture Notes in Computer Science, 2000, vol. 1901/2000, pp. 162-173.

(Continued)

*Primary Examiner* — Alex Gofman
*Assistant Examiner* — Linh Black
(74) *Attorney, Agent, or Firm* — Alston & Bird LLP

(57) ABSTRACT

A publish/subscribe system is described that can adjust to provide high performance for diverse application environments through an attribute structure based on predicates of a subscription, each attribute structure with one or more buckets to which attribute values of a subscription may be stored. Various data structures can be used in the attribute structure to locate the buckets containing the subscriptions. The data structures selected for each subscription are based on the attribute type and predicate operators of the subscription.

24 Claims, 22 Drawing Sheets

(56) References Cited

U.S. PATENT DOCUMENTS

| | | | | |
|---|---|---|---|---|
| 2004/0002973 | A1* | 1/2004 | Chaudhuri | G06F 17/3053 |
| 2005/0050060 | A1* | 3/2005 | Damm | H04L 45/00 |
| 2011/0246503 | A1* | 10/2011 | Bender | G06F 17/30306 |
| | | | | 707/769 |
| 2012/0054363 | A1* | 3/2012 | Hart | H04L 12/66 |
| | | | | 709/232 |
| 2014/0280037 | A1* | 9/2014 | Petride | G06F 17/30442 |
| | | | | 707/719 |
| 2015/0020196 | A1* | 1/2015 | Wijbrans | H04L 51/12 |
| | | | | 726/22 |
| 2015/0215409 | A1* | 7/2015 | Chow | G06Q 30/0259 |
| | | | | 455/456.3 |

OTHER PUBLICATIONS

Fabret, F., et al., "Filtering Algorithms and Implementation for Very Fast Publish/Subscribe Systems," Proceedings of the 2001 ACM SIGMOD, vol. 30 Issue 2, Jun. 2001, pp. 115-126.

* cited by examiner

Algorithm: search(Event $e$, Bucket $b$)
Input:
$e$: event having attributes $e_1, e_2, ..., e_j$
$b$: current bucket, initially the header bucket
Output:
list of matching subscriptions

```
1:      foreach e_i, 1 ≤ i ≤ j
2:          // A_{e_i} is the attribute structure for e_i associated with b
3:          if (A_{e_i} exists) then
4:              B = buckets in A_{e_i} determined by D and
5:              e_i to possibly have matching subscriptions
6:              foreach b ∈ B
7:                  add matching subscriptions in b to output list
10:                 search (e, b);
11:             endfor
12:         endif
13:     endfor
```

FIG. 2

```
Algorithm: insert(Subscription s, Attribute s_k, Bucket b)
Input:
s: subscription with ordered attributes s_1 < s_2 < ... < s_j
s_k: current attribute, initially s_1
b: current bucket, initially the header 1:  if (b has no associated attribute structure Z_i for s_k) then
2:      create an attribute structure Z_i for s_k associated with b
3:      move subscriptions (if any), with attribute s_k in b, to Z_i
4:          in accordance with data structure D.
5:      add s in Z_i in accordance with data structure D.
6:  else
7:      Use D and predicate on s_k to find an
8:          appropriate bucket b' in Z_i for s.
9:      if b' has space then
10:         add s to b'
11:     else
12:         split b' and s into 2 or more buckets as per D.
13:         if such a split is not possible then
14:             if (k < j) then
15:                 insert(s, s_{k+1}, b');
16:             else
17:                 if there is a subscription s' in b' with a
18:                 k + 1st attribute a' then
19:                     replace s' by s in b';
20:                     insert(s', a', b');
21:                 else
22:                     expand b' to include s
23:                 endif
24:             endif
25:         endif
26:     endif
27: endif
```

FIG. 3

```
Algorithm: Bucket::match(Event e)
Input:
e: event
Output:
matching subscriptions 1:    j = 0;
2:    for i // iterate over the subscription groups, increment i by 2
3:       attr = group[i];
4:       groupEndIndex = group[i+1];
5:       if (attr exists in e) then
6:          endIndex = binarySearch(attr, j, groupEndIndex);
7:          for j up to endIndex, incremented by 1
8:             match jth subscription in bucket with event
9:             if (matched) then
10:               append jth subscription to output list
11:            endif
12:         endfor
13:      else
14:         j = groupEndIndex + 1;
15:      endif
16:   endfor
```

FIG. 4

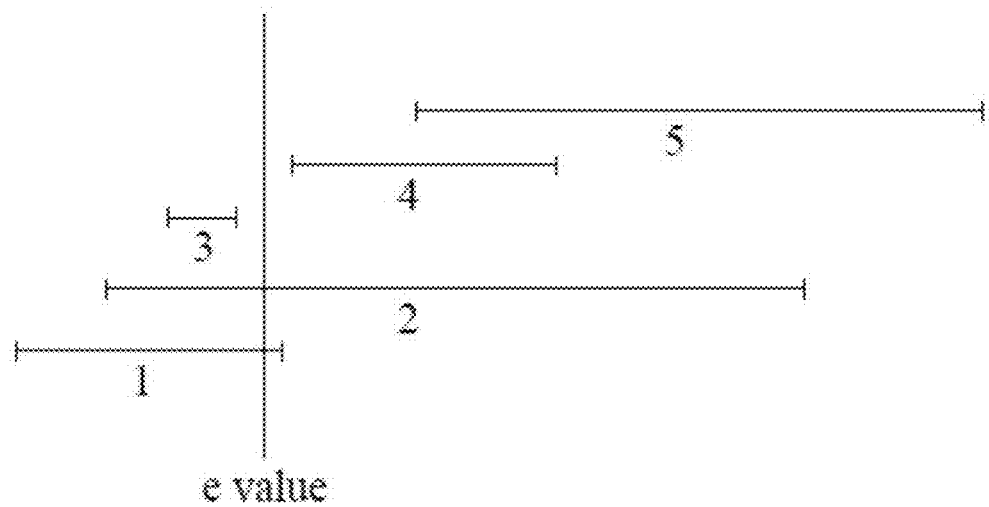

FIG. 5

```
class Bucket {
    mySubscriptionArray; // stores subscriptions
    Bucket* myLeftChild; // left child pointer
    Bucket* myRightChild; // right child pointer
    myX; // x-coordinate of point in node
    myY; // y-coordinate of point in node
}
```

```
Bucket::insert(s, x, y, lowX, highX)
Input:
s: subscription to be inserted
(x, y): insert key
[lowX, highX]: interval associated with current bucket
b: current bucket 1:   if (y < myY) then
2:       insert a new bucket q in place of b
3:       q inherits the children of b
4:       add subscriptions in b recursively to a subtree of q
5:   else
6:       if (x == myX and y == myY) then
7:           // insert key coincides with bucket key
8:           if (there is space in b) then
9:               add s to b
10:          else
11:              create a next level attribute structure for b
12:              insert s in the bucket for the new attribute structure
13:          endif
14:      else
15:          // insert key is different than bucket key
16:          if (b is a leaf bucket) then
17:              if (there is space in b) then
18:                  add s to b
19:              else
20:                  split b and s into two or more RPST buckets
21:                  if (this split is not possible) then
22:                      create a next level attribute structure for b
23:                      insert s in the new attribute structure.
24:                  endif
25:              endif
26:          else
27:              // b is a non-leaf bucket
28:              m = (lowX + highX)/2;
29:              if (x < m) then
30:                  if (!myLeftChild) create myLeftChild;
31:                  myLeftChild->insert(s, x, y, lowX, m);
32:              else
33:                  if (!myRightChild) create myRightChild;
34:                  myRightChild->insert(s, x, y, m, highX);
35:              endif
36:          endif
37:      endif
38:  endif
```

FIG. 8

```
Bucket::search (v, lowX, highX)
Input:
v: value of attribute i (used to construct the PST) in event
[lowX, highX]: interval associated with current bucket
b: current bucket
Output:
list of matching subscriptions 1:   if (b is a leaf bucket) then
2:       examine the subscriptions in b using Figure 4;
3:   endif
4:   if (myY > v) then return;
5:   else
6:       if (v ≤ myX) then
7:           // all subscriptions in b and its associated
8:           // attribute structures match with event for attribute i;
9:           examine subscriptions for the other attributes;
10:          append matching subscriptions in b to output list
11:          middleX = (lowX + highX)/2;
12:          if (x < middleX) then
13:              myLeftChild→search(v, lowX, middleX);
14:              myRightChild→search(v, middleX, highX);
15:          else
16:              myRightChild→search(v, middleX, highX);
17:          endif
18:      endif
19:  endif
20:  foreach attribute structure associated with b
21:      search for subscriptions matching event
22:  endfor
```

FIG. 9

| Experiment Parameter | A | B | C | D | E | F | G | H | I | K(Author) | K(Title) |
|---|---|---|---|---|---|---|---|---|---|---|---|
| Size | 1M | 100K-5M | 1M | 100K | 100K | 100K | 100K | 1M | 1M | 100-760K | 50-250K |
| Number of Dimensions | 1000 | 400 | 100-1500 | 400 | 400 | 400 | 400 | 400 | 400 | 677 | 677 |
| Dimensions Cardinality | 32 | 48 | 48 | 48-100K | 50 | 2-10 | 48 | 48 | 48 | 28 | 36 |
| Average Sub Size | 7 | 7 | 7 | 7 | 7 | 7 | 5-66 | 7 | 7 | 8 | 35 |
| Average Event Size | 15 | 15 | 15 | 15 | 15 | 15 | 13-31 | 15 | 15 | 8 | 35 |
| Predicate Average Range % | 10 | 10 | 10 | 10 | 5-50 | 50 | 10 | 10 | 10 | . | . |
| % Equality Predicates | 30 | 30 | 30 | 30 | 0 | 100 | 30 | 30-100 | 30 | 100 | 100 |
| Operator Class | Medians | Medians | Medians | Medians | . | . | Medians | Medians | Lo-High | Max | Max |
| Matching Probability % | 0.01-15 | 1 | 1 | 1 | 1 | 1 | 1 | 1 | 0.01-15 | 1 | 1 |

FIG. 10

| Data Sets | Size | RPST | Interval | RBPST | BE-tree | Siena |
|---|---|---|---|---|---|---|
| Uniform | 100k | 62.79 | 64.47 | 62.69 | 145.5455 | 3838.38 |
| Uniform | 200k | 108.61 | 110.43 | 107.92 | 265.6465 | 8181.82 |
| Uniform | 400k | 190.71 | 194.50 | 190.59 | 471.2222 | 21616.20 |
| Uniform | 600k | 271.05 | 286.07 | 303.43 | 669.6061 | 36666.70 |
| Uniform | 800k | 349.92 | 386.78 | 438.49 | 863.3333 | 53131.30 |
| Uniform | 1M | 429.22 | 486.92 | 569.36 | 1055.343 | 72323.20 |
| Uniform | 2M | 832.37 | 976.43 | 1188.45 | 1996.14 | 175051 |
| Uniform | 3M | 1251.03 | 1440.82 | 1734.39 | 2870 | 287374 |
| Uniform | 4M | 1687.99 | 1871.80 | 2216.37 | 3719 | 416263 |
| Uniform | 5M | 2138.28 | 2304.87 | 2693.60 | 4541 | 540202 |
| Zipf | 100k | 284.46 | 331.26 | 344.03 | 406.0707 | 63131.30 |
| Zipf | 200k | 560.59 | 721.50 | 757.58 | 828.7778 | 144646.00 |
| Zipf | 400k | 1074.58 | 1182.37 | 1290.02 | 1625.778 | 339596.00 |
| Zipf | 600k | 1564.09 | 1574.51 | 1764.15 | 2273.848 | 733636.00 |
| Zipf | 800k | 2043.10 | 1940.93 | 2197.34 | 2886 | 805556.00 |
| Zipf | 1M | 2498.76 | 2331.00 | 2583.46 | 3471.384 | 1054040.00 |
| Zipf | 2M | 4590.02 | 4262.07 | 4329.00 | 6066 | 2350510 |
| Zipf | 3M | 6494.11 | 6218.18 | 5940.17 | 8451 | 3707370 |
| Zipf | 4M | 8445.57 | 8187.13 | 7392.98 | 10808 | 5130710 |
| Zipf | 5M | 10154.88 | 10114.48 | 8860.83 | 12866 | 6577070 |

| Data Sets | #dimensions | RPST | Interval | RBPST | BE-tree | Siena |
|---|---|---|---|---|---|---|
| Uniform | 50 | 414.80 | 439.76 | 478.60 | 1044.465 | 68990 |
| Uniform | 100 | 813.48 | 1101.60 | 1200.99 | 1218.202 | 158485 |
| Uniform | 400 | 430.08 | 487.84 | 570.37 | 1053.242 | 74444 |
| Uniform | 800 | 403.50 | 412.00 | 422.61 | 1023.364 | 55858 |
| Uniform | 1200 | 394.83 | 400.31 | 394.83 | 1013.131 | 50202 |
| Uniform | 1500 | 391.77 | 399.78 | 394.83 | 1011.111 | 50000 |
| Zipf | 50 | 2512.01 | 2324.76 | 2581.75 | 3468.01 | 1064730 |
| Zipf | 100 | 2622.78 | 2369.00 | 2621.04 | 3427.606 | 1117270 |
| Zipf | 400 | 2503.73 | 2331.00 | 2581.75 | 3454.545 | 1053540 |
| Zipf | 800 | 2523.60 | 2358.97 | 2598.87 | 3461.283 | 1057780 |
| Zipf | 1200 | 2463.34 | 2306.40 | 2533.67 | 3437.707 | 1000810 |
| Zipf | 1500 | 2460.08 | 2317.11 | 2537.04 | 3400.677 | 1048380 |

| Data Sets | dimension cardinality | RPST | Interval | RBPST | BE-tree | Siena |
|---|---|---|---|---|---|---|
| Uniform | 48 | 63.03 | 64.97 | 62.92 | 145.2727 | 3535.35 |
| Uniform | 200 | 62.53 | 64.50 | 62.74 | 147.2424 | 3939.39 |
| Uniform | 1k | 62.90 | 64.42 | 62.82 | 152.8182 | 3737.37 |
| Uniform | 10k | 62.28 | 64.53 | 62.40 | 161 | 3636.36 |
| Uniform | 50k | 62.51 | 64.50 | 62.35 | 164.1414 | 3636.36 |
| Uniform | 100k | 62.40 | 64.39 | 62.45 | 167.5152 | 3030.30 |
| Zipf | 48 | 283.58 | 330.10 | 341.93 | 428.4343 | 63030.30 |
| Zipf | 200 | 291.01 | 327.68 | 410.88 | 337.0404 | 61010.10 |
| Zipf | 1k | 286.96 | 328.17 | 591.86 | 341.596 | 60606.10 |
| Zipf | 10k | 276.35 | 319.40 | 834.17 | 408.9495 | 59697.00 |
| Zipf | 50k | 265.99 | 309.42 | 886.05 | 461.2323 | 57878.80 |
| Zipf | 100k | 266.73 | 315.66 | 889.60 | 469.0404 | 57575.80 |

| Data Sets | predicate selectivity | RPST | Interval | RBPST | BE-tree | Siena |
|---|---|---|---|---|---|---|
| Uniform | 5 | 63.98 | 65.73 | 64.26 | 158.07 | 6060 |
| Uniform | 10 | 63.93 | 65.93 | 64.12 | 180.56 | 5858 |
| Uniform | 20 | 64.01 | 66.72 | 64.09 | 192.03 | 6161 |
| Uniform | 30 | 64.04 | 66.31 | 64.39 | 194.25 | 5858 |
| Uniform | 40 | 64.50 | 66.25 | 64.42 | 198.84 | 5858 |
| Uniform | 50 | 59.07 | 61.74 | 59.28 | 178.15 | 6464 |
| Uniform | 5 | 212.50 | 208.70 | 198.06 | 561.17 | 105455 |
| Uniform | 10 | 227.16 | 230.27 | 253.12 | 1029.48 | 109091 |
| Uniform | 20 | 257.58 | 276.35 | 372.27 | 1958.04 | 124343 |
| Uniform | 30 | 291.20 | 338.43 | 490.34 | 2966.81 | 127374 |
| Uniform | 40 | 324.44 | 389.50 | 589.95 | 3614.72 | 134040 |
| Uniform | 50 | 350.62 | 423.23 | 644.15 | 3947.16 | 140303 |

| Size | RPST | Interval | RBPST | BE-tree | Siena |
|---|---|---|---|---|---|
| 1M | 402.97 | 406.75 | 403.23 | 1990.49 | 58080.8 |
| 2M | 776.13 | 794.33 | 777 | 3756.08 | 148889 |
| 3M | 1156.60 | 1180.02 | 1151.67 | 4009.32 | 239495 |
| 5M | 1902.78 | 1972.98 | 1902.78 | 7894.32 | 454747 |

| Data Sets | dimension selectivity | RPST | Interval | RBPST | BE-tree | Siena |
|---|---|---|---|---|---|---|
| Uniform | 2 | 64.42 | 66.54 | 65.20 | 266.34 | 2727.27 |
| Uniform | 4 | 64.12 | 66.28 | 64.53 | 258.60 | 2222.22 |
| Uniform | 5 | 64.09 | 66.28 | 64.42 | 257.68 | 1919.19 |
| Uniform | 6 | 64.20 | 66.40 | 64.45 | 256.63 | 1616.16 |
| Uniform | 8 | 63.98 | 66.22 | 64.26 | 255.72 | 1616.16 |
| Uniform | 10 | 65.48 | 66.19 | 64.53 | 255.08 | 1414.14 |
| Zipf | 2 | 301.62 | 350.96 | 276.17 | 958.65 | 38484.80 |
| Zipf | 4 | 64.26 | 66.37 | 64.39 | 258.60 | 2020.20 |
| Zipf | 5 | 64.15 | 66.16 | 64.47 | 257.94 | 1818.18 |
| Zipf | 6 | 64.12 | 66.22 | 65.39 | 257.94 | 1717.17 |
| Zipf | 8 | 64.17 | 66.25 | 64.23 | 255.72 | 1717.17 |
| Zipf | 10 | 64.45 | 66.19 | 64.45 | 255.08 | 1717.17 |

| Data Sets | subscription/event size | PST | Interval | RBPST | BE-tree | Siena |
|---|---|---|---|---|---|---|
| Uniform | 5/13 | 35.89 | 37.99 | 35.79 | 121.97 | 1616.16 |
| Uniform | 7/15 | 61.59 | 63.82 | 61.77 | 145.48 | 2626.26 |
| Uniform | 14/25 | 93.41 | 95.05 | 93.30 | 238.80 | 6262.63 |
| Uniform | 27/43 | 151.31 | 153.67 | 150.91 | 397.30 | 16262.60 |
| Uniform | 45/61 | 230.42 | 253.96 | 250.44 | 585.04 | 35252.50 |
| Uniform | 66/81 | 326.98 | 435.39 | 428.01 | 808.89 | 66868.70 |
| Zipf | 5/13 | 356.14 | 383.58 | 438.78 | 464.27 | 52222.20 |
| Zipf | 7/15 | 277.69 | 335.66 | 350.73 | 398.07 | 63535.40 |
| Zipf | 14/25 | 162.74 | 169.10 | 162.68 | 373.85 | 120505.00 |
| Zipf | 27/43 | 155.24 | 156.79 | 155.03 | 534.98 | 190404.00 |
| Zipf | 45/61 | 198.71 | 199.62 | 198.32 | 748.22 | 310505.00 |
| Zipf | 66/81 | 264.42 | 264.89 | 263.96 | 998.22 | 482323.00 |

| Data Sets | % of equality predicates | RPST | Interval | RBPST | BE-tree | Siena |
|---|---|---|---|---|---|---|
| Uniform | 20 | 429.79 | 493.24 | 569.36 | 907.28 | 77474.70 |
| Uniform | 40 | 428.29 | 477.73 | 554.45 | 1281.16 | 66767.70 |
| Uniform | 50 | 427.37 | 468.89 | 547.35 | 1536.38 | 59494.90 |
| Uniform | 60 | 426.46 | 458.36 | 535.39 | 1769.41 | 54040.40 |
| Uniform | 80 | 422.33 | 439.07 | 497.76 | 2172.79 | 41313.10 |
| Uniform | 100 | 419.39 | 421.72 | 418.23 | 2438.68 | 28282.80 |
| Zipf | 20 | 2628.00 | 2497.10 | 2756.66 | 5095.96 | 1194850.00 |
| Zipf | 40 | 2326.29 | 2111.39 | 2348.10 | 2679.42 | 923030.00 |
| Zipf | 50 | 2180.38 | 1934.54 | 2132.44 | 2325.53 | 772727.00 |
| Zipf | 60 | 2024.24 | 1719.44 | 1901.52 | 2244.67 | 633939.00 |
| Zipf | 80 | 1738.98 | 1354.62 | 1448.77 | 2358.46 | 339091.00 |
| Zipf | 100 | 827.84 | 720.00 | 537.29 | 2460.31 | 50606.10 |

| Data Sets | % of match probability | RPST | Interval | RBPST | BE-tree | Siena |
|---|---|---|---|---|---|---|
| Uniform(lo) | 0.01 | 65.97 | 81.99 | 121.82 | 149.96 | 32406.5 |
| Uniform(lo) | 0.1 | 98.27 | 109.17 | 165.22 | 269.74 | 36676.7 |
| Uniform(lo) | 1 | 413.67 | 424.07 | 489.08 | 1231.83 | 83636.4 |
| Uniform(lo) | 5 | 1880.95 | 1828.78 | 2048.00 | 4568.95 | 384737 |
| Uniform(lo) | 10 | 3695.49 | 3646.97 | 3908.40 | 8051.56 | 908889 |
| Uniform(lo) | 15 | 5506.61 | 5494.51 | 5800.46 | 11540.17 | 1471670 |
| Zipf (lo) | 0.01 | 773.04 | 760.16 | 779.48 | 1033.70 | 1127790 |
| Zipf (lo) | 0.1 | 813.97 | 828.20 | 851.96 | 1151.15 | 1127750 |
| Zipf (lo) | 1 | 1208.91 | 1153.96 | 1212.93 | 2142.25 | 1247270 |
| Zipf (lo) | 5 | 2530.08 | 2505.00 | 2687.07 | 5273.68 | 1658950 |
| Zipf (lo) | 10 | 4125.41 | 4133.66 | 4397.54 | 8656.33 | 2005560 |
| Zipf (lo) | 15 | 5938.24 | 5960.32 | 6196.37 | 11964.33 | 2523330 |
| Zipf (lo) | 15 | 6915.39 | 5938.24 | 6203.47 | 42041.67 | 2523330 |
| Uniform (med) | 0.01 | 86.23 | 237.34 | 206.41 | 119.31 | 27200.4 |
| Uniform (med) | 0.1 | 114.51 | 237.27 | 247.79 | 224.22 | 30961 |
| Uniform (med) | 1 | 419.99 | 470.86 | 554.08 | 1039.99 | 70303 |
| Uniform (med) | 5 | 1880.95 | 1827.49 | 2214.36 | 4033.74 | 329474 |
| Uniform (med) | 10 | 3756.26 | 3639.01 | 4193.19 | 7243.89 | 764444 |
| Uniform (med) | 15 | 5621.72 | 5477.75 | 6131.54 | 10524.17 | 1245000 |
| Zipf (med) | 0.01 | 2136.49 | 1949.95 | 2083.75 | 2384.54 | 940694 |
| Zipf (med) | 0.1 | 2157.87 | 1990.74 | 2128.38 | 2490.49 | 950761 |
| Zipf (med) | 1 | 2621.04 | 2398.99 | 2624.52 | 3339.85 | 1040200 |
| Zipf (med) | 5 | 3813.88 | 3706.45 | 4020.84 | 6079.84 | 1410000 |
| Zipf (med) | 10 | 5000.00 | 5000.00 | 5446.62 | 8987.44 | 1725560 |
| Zipf (med) | 15 | 6761.26 | 6752.02 | 7267.44 | 11916.67 | 2138330 |
| Uniform (hi) | 0.01 | 91.51 | 315.98 | 198.58 | 141.14 | 18437.2 |
| Uniform (hi) | 0.1 | 119.33 | 315.32 | 235.08 | 248.54 | 20920.9 |
| Uniform (hi) | 1 | 424.07 | 502.37 | 540.64 | 1083.17 | 47373.7 |
| Uniform (hi) | 5 | 1878.98 | 1834.17 | 2155.46 | 4140.63 | 211579 |
| Uniform (hi) | 10 | 3728.56 | 3646.97 | 4097.73 | 7464.56 | 496667 |
| Uniform (hi) | 15 | 5591.52 | 5481.40 | 6028.11 | 10822.50 | 813333 |
| Zipf (hi) | 0.01 | 2474.87 | 2464.96 | 2419.65 | 3597.62 | 642854 |
| Zipf (hi) | 0.1 | 2510.84 | 2504.17 | 2483.91 | 3673.67 | 642262 |
| Zipf (hi) | 1 | 2974.85 | 2896.89 | 2958.43 | 4576.19 | 721111 |
| Zipf (hi) | 5 | 4241.49 | 4267.43 | 4452.99 | 7427.74 | 951053 |
| Zipf (hi) | 10 | 5322.01 | 5404.53 | 5735.01 | 10214.11 | 1136670 |
| Zipf (hi) | 15 | 7007.47 | 7086.87 | 7482.59 | 13267.17 | 1400000 |

FIG. 27

| Data Sets | Size | PS-RPST | PS-IT | PS-RPST4+IT |
|---|---|---|---|---|
| Zipf | 1M | 3087 | 2953 | 2868 |
| Zipf | 2M | 5810 | 5455 | 5060 |
| Zipf | 3M | 8293 | 7591 | 7011 |
| Zipf | 4M | 10768 | 9634 | 8930 |
| Zipf | 5M | 13013 | 11522 | 10511 |

| Data Sets | % of match probability | PS-RPST | PS-IT | PS-RPST4+IT |
|---|---|---|---|---|
| Zipf(mid) | 0.01 | 2532 | 2380 | 2347 |
| Zipf(mid) | 0.1 | 2606 | 2455 | 2393 |
| Zipf(mid) | 1 | 3234 | 3059 | 2921 |
| Zipf(mid) | 5 | 5020 | 4872 | 4370 |
| Zipf(mid) | 10 | 6579 | 6536 | 5676 |
| Zipf(mid) | 15 | 8897 | 8834 | 7645 |
| Zipf(hi) | 0.01 | 3362 | 3205 | 2958 |
| Zipf(hi) | 0.1 | 3481 | 3357 | 3041 |
| Zipf(hi) | 1 | 4637 | 4424 | 3975 |
| Zipf(hi) | 5 | 8215 | 8139 | 6357 |
| Zipf(hi) | 10 | 11745 | 11852 | 7585 |
| Zipf(hi) | 15 | 16266 | 16362 | 11928 |

| Data Sets | #subscriptions | RPST | Interval | RBPST | BE-tree | Siena |
|---|---|---|---|---|---|---|
| Author | 100k | 53.79 | 55.02 | 53.84 | 163.08 | 2222.22 |
| Author | 200k | 98.77 | 99.62 | 98.71 | 290.84 | 4949.49 |
| Author | 300k | 141.21 | 144.85 | 141.08 | 363.13 | 8888.89 |
| Author | 400k | 188.11 | 192.41 | 186.72 | 464.27 | 12424.20 |
| Author | 600k | 269.78 | 284.11 | 272.51 | 641.86 | 20909.10 |
| Author | 800k | 359.28 | 377.84 | 358.67 | 817.86 | 30101.00 |
| Title | 50k | 121.02 | 122.98 | 120.71 | 319.97 | 4343.43 |
| Title | 75k | 163.03 | 166.06 | 162.92 | 441.09 | 6969.70 |
| Title | 100k | 219.42 | 222.49 | 218.47 | 589.62 | 10101.00 |
| Title | 150k | 261.58 | 266.28 | 260.06 | 735.62 | 14848.50 |
| Title | 200k | 340.71 | 347.18 | 339.19 | 1000.10 | 21919.20 |
| Title | 250k | 407.30 | 415.66 | 413.11 | 1154.73 | 28282.80 |

| Data Sets | PS-RPST | | PS-IT | | PS-RBPST | | BE-Tree | | Siena | |
|---|---|---|---|---|---|---|---|---|---|---|
| | sec | MB | sec | MB | sec | MB | sec | MB | sec | MB |
| Unif(1M) | 26 | 683 | 48 | 707 | 25 | 680 | 189 | 965 | 25 | 266 |
| Zipf(1M) | 27 | 702 | 199 | 726 | 24 | 679 | 398 | 890 | 119 | 226 |
| Author(1M) | 42 | 1416 | 65 | 1607 | 43 | 1421 | 32 | 1552 | 31 | 437 |
| Title(1M) | 27 | 725 | 27 | 747 | 27 | 721 | 41 | 931 | 27 | 236 |

EFFICIENT PUBLISH/SUBSCRIBE SYSTEMS

CROSS REFERENCE TO RELATED APPLICATION

The present application claims the benefit of U.S. Provisional Application Ser. No. 61/788,333 filed Mar. 15, 2013, which is hereby incorporated by reference herein in its entirety, including any figures, tables, or drawings.

GOVERNMENT SUPPORT

This invention was made with government support under Grant FA8750-11-1-0245 awarded by the Air Force. The government has certain rights in the invention.

BACKGROUND

A publish-subscribe paradigm involves publishers, who generate and feed content into the system, subscribers, who specify content of their interest, and an infrastructure—the system—for matching subscriber interests with published content and delivering matched content to the subscribers.

A publish/subscribe (pub/sub) system generally maintains a database of subscriptions, where each subscription is stored as a Boolean expression, which can be expressed by predicates and attributes. When a publisher generates content that matches a subscription stored in the database, the content can be provided to the subscriber. This matching of content to subscription can be referred to as an event. When an event occurs, the pub/sub system can report all subscriptions in its database that are matched or satisfied by the event. Therefore, customers who posted these matching subscriptions may then be notified.

For example, each subscription in the pub/sub system of a diverse online vendor may describe the conditions that a customer has for purchasing a product. A potential customer may post a set of conditions as a subscription to the vendor's pub/sub system in order to search for a product defined by the set of conditions (which may be in the form of a Boolean expression defining a product by its attributes). As a specific example, a customer may subscribe to content related to a camera by posting a subscription indicating item, price, manufacturer, and zoom. Then, when an event occurs—where a publisher/vendor indicates that a product matches (or falls within a range) of the subscription, the pub/sub system reports all subscriptions in its database that are matched (or satisfied by the event). Customers who posted these matching subscriptions may then be notified.

Pub/sub systems are used in diverse applications with varied performance requirements. For example, in some applications events occur at a much higher rate than the posting/removal of subscriptions while in other applications the subscription rate may be much higher than the event rate and in yet other applications the two rates may be comparable. Optimal performance in each of these scenarios may result from deploying a different data structure for the subscriptions or a different tuning of the same structure. Many commercial applications of pub/sub systems have thousands of attributes and millions of subscriptions. So, scalability in terms of number of attributes and number of subscriptions is critical.

The problem of rapidly evaluating a large number of predicates against specified events has been studied extensively in the literature. Yan and Garcia-Molina proposed the use of indexes to speed the evaluation of a collection of Boolean expressions and developed SIFT (T. W. Yan and H. Garcia-Molina, The SIFT Information Dissemination System. *ACM TODS,* 1999), which is a system based on indexing. Later, various researchers proposed decision trees and index structures for this problem. The proposed approaches can be divided into two main categories. The first category is counting-based while the second category is based on partitioning subscriptions into subsets (partitioning-based). Counting-based pub/sub systems build an inverted index structure from the subscriptions and minimize the number of predicate evaluations while partitioning-based systems minimize evaluations by recursively eliminating the subscriptions that cannot be satisfied.

One partitioning-based system involves BE-Tree developed by Sadoghi and Jacobsen (M. Sadoghi and H.-A. Jacobsen, BE-Tree: An Index Structure to Efficiently Match Boolean Expressions over High-dimensional Discrete Space, *SIGMOD* 2011). BE-tree partitions subscriptions defined on a high dimensional space using two phase space cutting technique, space partitioning and space clustering, to group the expressions with respect to the range of values for the various attributes. Experimental results reported by Sadoghi and Jacobsen indicate that the BE-tree outperforms state-of-the-art pub/sub systems such as SCAN (T. W. Yan and H. Garcia-Molina, Index Structures for Selective Dissemination of Information Under the Boolean Model, *ACM TODS* 1994), SIFT (T. W. Yan and H. Garcia-Molina, The SIFT Information Dissemination System. *ACM TODS,* 1999), Propagation (F. Fabret, H.-A. Jacobsen, F. Llirbat, J. Pereira, K. A. Ross, and D. Shasha, Filtering algorithms and implementation for fast pub/sub systems, *SIGMOD* 2001), Gryphon (M. K. Aguilera, R. E. Strom, D. C. Sturman, M. Astley, and T. D. Chandra, Matching events in a content-based subscription system, *PODC* 1999), and k-index (S. Whang, C. Brower, J. Shanmugasundaram, S. Vassilvitskii, E. Vee, R. Yerneni, and H. Garcia-Molina, Indexing Boolean Expressions, *VLDB,* 2009). BE-Tree, however, is limited to attributes whose values are discrete and for which the range in discrete attribute values is pre-specified. So, BE-tree is unable to cope with real-valued attributes, string-valued attributes, and discrete-valued attributes with unknown range. Additionally, BE-tree employs a clustering policy that is ineffective when many subscriptions have a range predicate such as low≤ai≤high, where ai is an attribute and the clustering criterion p that is used for the BE-tree lies between low and high. In this case, all such subscriptions fall into the same cluster and event processing is considerably slowed.

One counting-based system involves a matching algorithm, Siena, developed by Carzaniga et al. (A. Carzaniga, D. Rosenblum, and A. Wolf, Design and evaluation of wide-area event notification service. *ACM Trans. On Computer Systems,* 19, 3, 2001, 332-383; A. Carzaniga and A. L. Wolf, Forwarding in a Content-Based Network, *ACM SIGCOMM* 2003). Siena is a pub/sub system that uses a counting algorithm to find matching subscriptions. It maintains an index of attribute names and types. This index is implemented using ternary search tries. Unlike BE-Tree, Siena is not limited to discrete valued attributes from a pre-specified finite domain. Further, Siena is able to work with attributes of type string and supports operators such as prefix, suffix, and substring on this datatype. Siena, however, does not support incremental updates (i.e., subscription posting and deletion) and so updates must be done in batch mode.

BRIEF SUMMARY

A versatile, efficient, and scalable pub/sub system is described. The system can include a database and a database manager.

A database of a pub/sub system according to an embodiment may be organized based on the attributes of the subscriptions being stored. When a new subscription is added to the database, the attribute types of the subscription are used to select a data structure from a set of data structures of the database. The attributes of the subscription are used to follow a path in an attribute structure stored in the database until a lowest level is reached where there are still non-empty attributes (if no non-empty attributes exist than a new highest level attribute structure and single bucket are created for the subscription). From this lowest non-empty attribute, the selected data structure is used to determine the appropriate bucket to insert the subscription.

To match an event to a subscription in the database, an attribute structure of the event is used to determine the data structure of the subscription and the attribute structure of the database to which the matching subscription is assigned. The determined data structure is used to determine which buckets of the attribute structure are searched, and then the buckets located by the data structure are recursively searched to find subscriptions matching the values of the attributes presented by an event.

According to certain embodiments, a priority search tree (such as Radix Priority Search Trees (RPST), Red-Black Priority Search Trees (RBPST)) or an interval tree may be selected as the data structure when the predicates of the subscription's attributes specify a range of values; a suffix tree may be selected when the predicates of the subscription's attributes use substring and suffix operators; a red-black tree may be selected for exact match attributes; and suffix trees and Aho-Corasick tries may be selected for string attributes. Of course, finite automata may be selected for regular expressions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 is an example of a search algorithm.

FIG. 3 is an example of an insert algorithm.

FIG. 4 is an example of a search algorithm for a large bucket.

FIG. 5 illustrates the predicate ranges ordered by starting points.

FIG. 8 is an example of an algorithm to insert a subscription in a RPST node.

FIG. 9 is an example of a RPST search algorithm.

FIG. 10 is a table of values for parameters used with BEGen for generating datasets.

FIG. 27 is a table of results for varying the percentage of match probability with expressiveness (microseconds/event).

DETAILED DESCRIPTION

Figure 1:
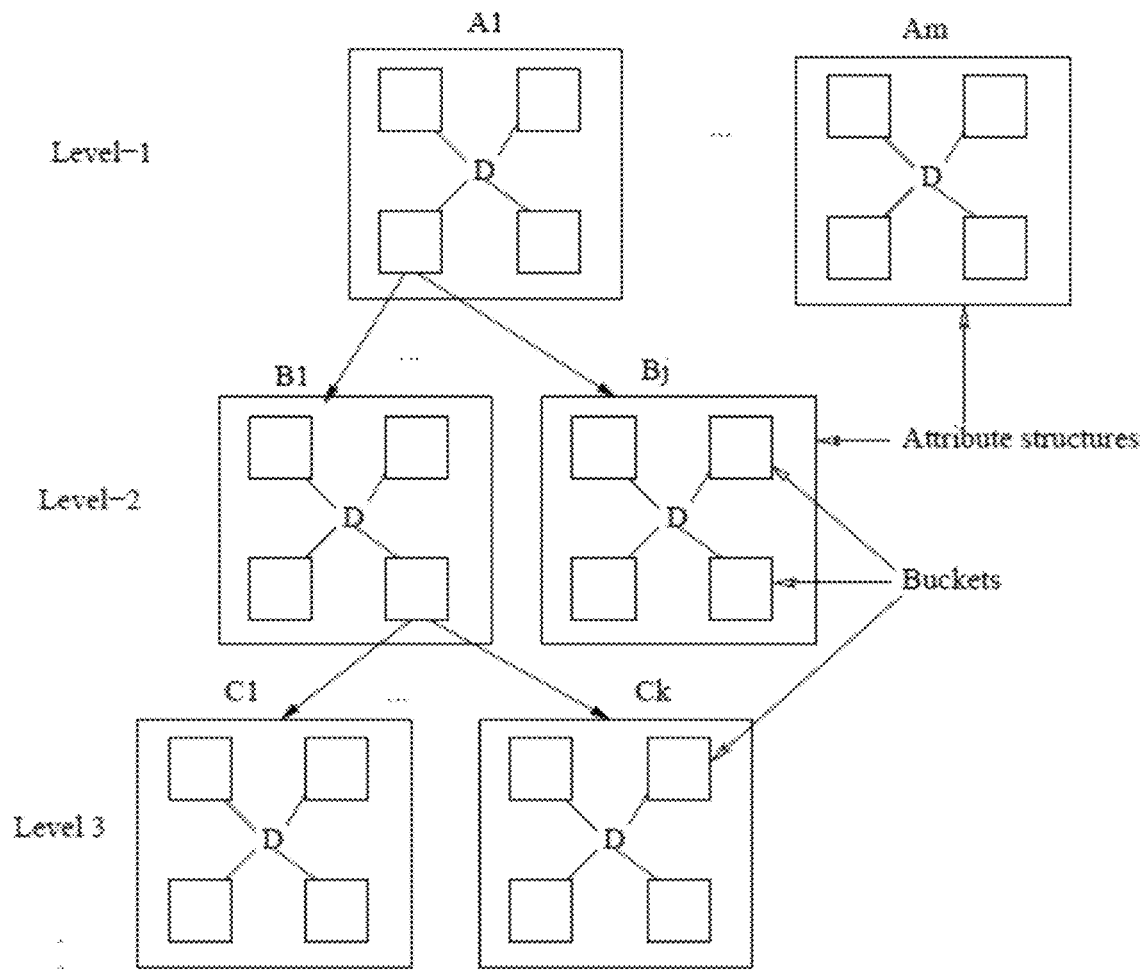
FIG. 1 is an illustration of a pub/sub subscription database.

A pub/sub system is described that is versatile and scalable and that may be tuned to provide high performance for diverse application environments. The pub/sub system of embodiments of the invention can be considered versatile because its architecture supports a variety of predicate types (e.g., ranges, regular expressions, string relations) as well as a heterogeneous collection of data structures for representation of subscriptions in order to achieve high throughput. Embodiments facilitate the tuning of system performance for applications in which events occur far more frequently than subscription posting/deletion; for applications in which subscription posting/deletion occurs far more frequently than publications; and for applications in which subscriptions and publications occur at comparable rates.

Subscriptions can be stored in the database managed by the pub/sub systems of embodiments of the invention in a structure referred to as a "bucket". The distribution of subscriptions is based on the attribute predicates and the data structure D used to keep track of the buckets. The data structure can be used by a database manager to efficiently locate the buckets that contain subscriptions that satisfy a particular attribute's value (e.g., value falls within the predicate conditions for the attribute).

The size of the buckets can depend on the application environment. Small buckets are used for high rates of subscription postings/deletions. The subscriptions can be stored in a small bucket as unordered lists. Large buckets are used for applications in which events occur frequently. Subscriptions in large buckets can be sorted by a first unused attribute (i.e., the first attribute that the group of subscriptions do not have in common with the path from header to current bucket). Subscriptions having the same first unused attribute can be further sorted based on the predicates of this same first unused attribute.

The data structure used to keep track of the buckets can depend on the attribute structure of the subscription being stored. In particular, a data structure can be selected based on the attribute structures of attribute type and predicate operators. Attribute structures may include range of values, string attributes using substring and suffix operators, and exact match attributes.

Processing an event through a pub/sub system of an embodiment of the invention entails searching for subscriptions that match an event. That is, the values of the attributes presented by an event are used to search for matching subscriptions. First the data structure of the subscription is determined according to the attribute structure of the event; then, the determined data structure is used to determine which buckets are searched. The buckets located by the data structure are recursively searched to find matching subscriptions.

Processing a subscription through a pub/sub system of an embodiment of the invention entails posting/inserting a subscription (or deleting a subscription, which can be performed by doing the inverse of insertion). To post a subscription, the attributes in the subscription, their structures (the attribute structures), and the data structure selected for the subscription according to the subscription's attribute structure are used to assign attributes of the subscription to buckets associated with the data structure.

The following illustrates embodiments of pub/sub systems according to the invention.

A. Database Organization of the Subject Pub/Sub System

FIG. 1 gives the organization of the subscription database used in a publish/subscribe system of an embodiment of the invention. This database, which is represented as hierarchical subscription data structure, comprises a collection of level-1 attribute structures $A_1, \ldots, A_m$, where m is the number of attributes. The allowable attributes have been numbered 1 through m and the attributes in a subscription are ordered using this numbering of attributes. The attribute structure $A_i$ stores all subscriptions that include a predicate on attribute i but not on any attribute j<i. For this terminology, the attribute i is associated with the structure $A_i$. With these assumptions on attribute ordering within subscriptions, $A_i$ contains all subscriptions whose first attribute is i. In practice, many of the $A_i$s will be empty and only non-empty attribute structures are stored in a database associated with a publish/subscribe system of an embodiment of the invention.

A level-k, k>0, attribute structure $A_i$ comprises 0 or more buckets that contain subscriptions. The distribution of subscriptions across these buckets is determined by the attribute i predicates in these subscriptions and the data structure D used to keep track of the buckets. The data structure D, when given a value vi for attribute i is able to efficiently locate the buckets that contain all subscriptions (and possibly others) whose predicate on attribute i is satisfied by $v_i$. Different attribute structures may use different data structures D to keep track of their buckets. Individual buckets of a level-k attribute structure may have higher level (i.e., larger k) attribute structures associated with them. The attribute associated with a level-k attribute structure is the $k^{th}$ attribute of the subscriptions stored in that structure. For uniformity, level-1 attribute structures are associated with a header bucket that is always empty.

To provide a better understanding of the organization of the subscription database, a description of how events are processed as well as how subscriptions are posted and deleted are provided herein.

FIG. 2 gives a high level description of the algorithm to process an event. To search for all subscriptions that match an event that specifies a value for the attributes $e_1<e_2<\ldots<e_j$, the level-1 attribute structures $A_{ei}$, $1 \le i \le j$ are searched. Note that the remaining attribute structures contain subscriptions that have at least one attribute (i.e, the first attribute) whose value is not specified by the event and so these subscriptions are not matched by the event. To search $A_{ei}$ for matching subscriptions, the associated data structure D is used to locate the buckets that may possibly contain matching subscriptions. The subscriptions stored in these buckets are examined to determine those that match the event. Additionally, level-2 attribute structures associated with these buckets and whose associated attribute has a value specified in the event (i.e., the associated attribute is one of the $e_i$s) are recursively searched for matching subscriptions. Note that only those attribute structures (regardless of level) whose associated attribute is one of the $e_i$s may be examined when processing an event; the D structures determine which of these are actually examined.

A high level description of the algorithm to post/insert a subscription is given in FIG. 3. Using the attributes in the subscription, the attributes associated with attribute structures, and the D structures, a path that begins at the level-1 attribute structure for the first attribute in the subscription is followed, which can then progress to the appropriate level-2 structure for the second attribute, and so on. If no non-empty attribute structure is encountered, then a new level-1 attribute structure with a single bucket is created for this subscription. The attribute associated with this newly created structure is the first attribute of the new subscription.

If non-empty attribute structures are encountered, let k be the lowest level at which this happens and let $Z_i$ be the attribute structure encountered at this level. To insert into a level-k attribute structure $Z_i$, the data structure D for this structure is used to determine the appropriate bucket b' of $Z_i$ for insertion. If this bucket is full, its subscriptions, along with the new subscription, are split into 2 or more buckets in accordance with the data structure D. In case such a split is not possible (this happens when D is unable to distinguish among the attribute i predicates of the subscriptions in the bucket), the next attribute in the new subscription is used to create a new attribute structure that includes the new subscription and all subscriptions in the full bucket that have a predicate on this attribute. When the new subscription does not have a next attribute, a subscription in the full bucket that has a next attribute is used instead. When no subscription has a next attribute, the full bucket is expanded beyond its designed maximum capacity.

To delete a subscription, a procedure is used that that is the inverse of that used to insert a subscription.

B. Data Structures of the Pub/Sub System of the Invention

1) Global Hash Table: A single global hash table is used to keep track of all attribute structures regardless of their level and which bucket they may be associated with. The use of a hash table enables faster branching to a next level bucket than when each bucket stores links to next level buckets. The hash key for an attribute structure $Z_i$ associated with bucket b is the 4 pair (b, i). Each $Z_i$ is kept track of by using some characteristic of $Z_i$ such as the header (if any) of the data structure D used in Z.

2) Bucket: A bucket is used to store subscriptions. The organization of a bucket is application dependent, some exemplary organizations for small and large buckets are described herein. Small buckets store few subscriptions, while large ones may store over a thousand subscriptions. Small buckets are useful in applications where the rate at which subscriptions are posted/deleted is high while large ones are useful when the time to process an event is of primary concern.

Subscriptions in a small bucket may be stored as an unordered list. Subscriptions in a large bucket are sorted on the first attribute not associated with the attribute structures on the path from the header to the current bucket. Each group of subscriptions with the same first unused attribute is further sorted based on the predicates of this common attribute. For example, consider a subscription that has a predicate $0 \leq a \leq 10$. Then, the predicate range of attribute a is [0, 10]. Subscriptions in a group are sorted by the starting point of the predicate range for the common attribute.

FIG. 4 describes the algorithm to find matching subscriptions in a large bucket. In this algorithm, the common attribute, which is the first unused attribute for a group of subscriptions in a bucket, is checked to determine if it is present in the event (line 5). If the common attribute is not present in the event, then the whole group of subscriptions is skipped (line 14). If the common attribute is present, subscriptions from the beginning of the group up to a certain subscription given by endIndex (lines 6-7) in the group are matched, thereby skipping the rest of the subscriptions (from endIndex+1 up to groupEndIndex) in that group.

The processed subscriptions have the start points of predicate ranges to the left of the event value, whereas those that are skipped have their start points to the right, which can completely eliminate the possibility that the event value will be included in the predicate ranges of the skipped subscriptions. FIG. 5 shows a group of 5 predicate ranges and an event value corresponding to the common attribute. The three subscriptions with predicate ranges marked as 1, 2, and 3 are considered for matching with the event, whereas the remaining predicate ranges 4 and 5, are skipped for this event.

In certain embodiments described hereafter, the term bucket size is used to mean the maximum number of subscriptions permitted in a bucket. Actual size of the bucket may vary dynamically. The actual size includes both the number of subscriptions currently in a bucket as well as the number of subscription slots presently available in the bucket. In some embodiments when all subscription slots are occupied, the bucket may be expanded using a technique such as array doubling (D. Mehta and S. Sahni, Handbook of Data Structures and Applications, *Chapman & Hall/CRC,* 2005).

3) D Structures: In addition to finite automata (S. C. Kleene, Representation of Events in Nerve Nets and Finite Automata, Automata Studies, Princeton University Press, 1956, 3-40), Priority Search Trees (E. M. McCreight, Priority Search Trees, *Siam J. Comput.* Vol. 14, No. 2, May 1985, 257-276), Interval Trees (D. Mehta and S. Sahni, Handbook of Data Structures and Applications, *Chapman & Hall/CRC,* 2005), Suffix Trees (E. M. McCreight, A Space-Economical Suffix Tree Construction Algorithm, Journal of the ACM, Volume 23, No. 2, 1973, 262-272), and Aho-Corasick Tries (A. V. Aho and M. J. Corasick, Efficient String Matching: An Aid to Bibliographic Search, *Communications of the ACM*, Volume 18, No. 6, Jun. 1975, 333-340) are all examples of structures that can be used for D, depending on the type of attribute being partitioned by D and the operators being supported in the predicates on this attribute. For example, priority search trees and interval trees could be good choices for attributes whose predicates specify a range of values while suffix trees could be good choices for string attributes whose predicates use the substring and suffix operators.

In one embodiment, the pub/sub system comprises at least one priority search tree. Contemplated priority search trees include, but are not limited to, Radix Priority Search Trees (RPST), Red-Black Priority Search Trees (RBPST) and Interval Trees (IT). These data structures are well suited to determine which of a set of range predicates are satisfied by a specified attribute value. In certain embodiments, the pub/sub system comprises attribute data structures such as red-black trees for exact match attributes and suffix trees and Aho-Corasick tries for string attributes. Of course, finite automata can be used for regular expressions.

a) Priority Search Trees:

Priority Search Trees (PSTs) store records with two dimensional keys (x, y) and provide efficient support for operations such as exact-match search (retrieve the record with key equal to (x, y), rectangle search (report all points that lie inside a specified rectangle; specifically, report all (x, y) such that $l \leq x \leq r$ and $0 \leq y \leq t$, where l, r, t, and 0 specify the boundaries of the query rectangle), insert, and delete. According to the subject invention, priority search trees can be used for attributes whose predicates are specified as ranges as in $low \leq a \leq high$. Predicates such as $a \leq high$, $a \leq low$, and $a = value$ may be recast as the ranges $min \leq a \leq high$, $low \leq a \leq max$, and $value \leq a \leq value$, respectively. Here, min and max are, respectively, the least and largest permissible values for the attribute a. To store a range [i,j] in a PST, the range to the two dimensional point (x, y)=(j, i) is mapped. Thus, the range [2, 6] is stored as the point (6, 2), in the PST. This reversal of the end points of a range when mapping to a point in two dimensions is necessary to enable efficient implementation of the rectangle search operation (E. M. McCreight, Priority Search Trees, *Siam J. Comput.* Vol. 14, No. 2, May 1985, 257-276).

Although, in general applications, the x and y coordinates of a key stored in a PST may come from different domains, in the pub/sub system of the subject application, they can come from the same domain as they represent the end points of a range. For example, as described below, RPSTs and RBPSTs can be used as the D structure for an attribute.

a.i) Radix Priority Search Trees (RPST):

To use an RPST on an attribute, the minimum and maximum permissible values for the attribute are known. The difference between the maximum and minimum permissible values is called the domain cardinality for the attribute. Although, RPSTs are typically used for discrete-valued attributes with known minimum and maximum values, they may also be used in a publish/subscribe system of an embodiment of the invention, for continuous valued attributes with known minimum and maximum. For discrete domains, exact-match search, insert and delete can be done in time O(log K), where K is the cardinality of the domain; the time for a rectangle search is O(s+log K), where s is the number of points in the RPST that lie within the query rectangle.

Figures 6, 7:
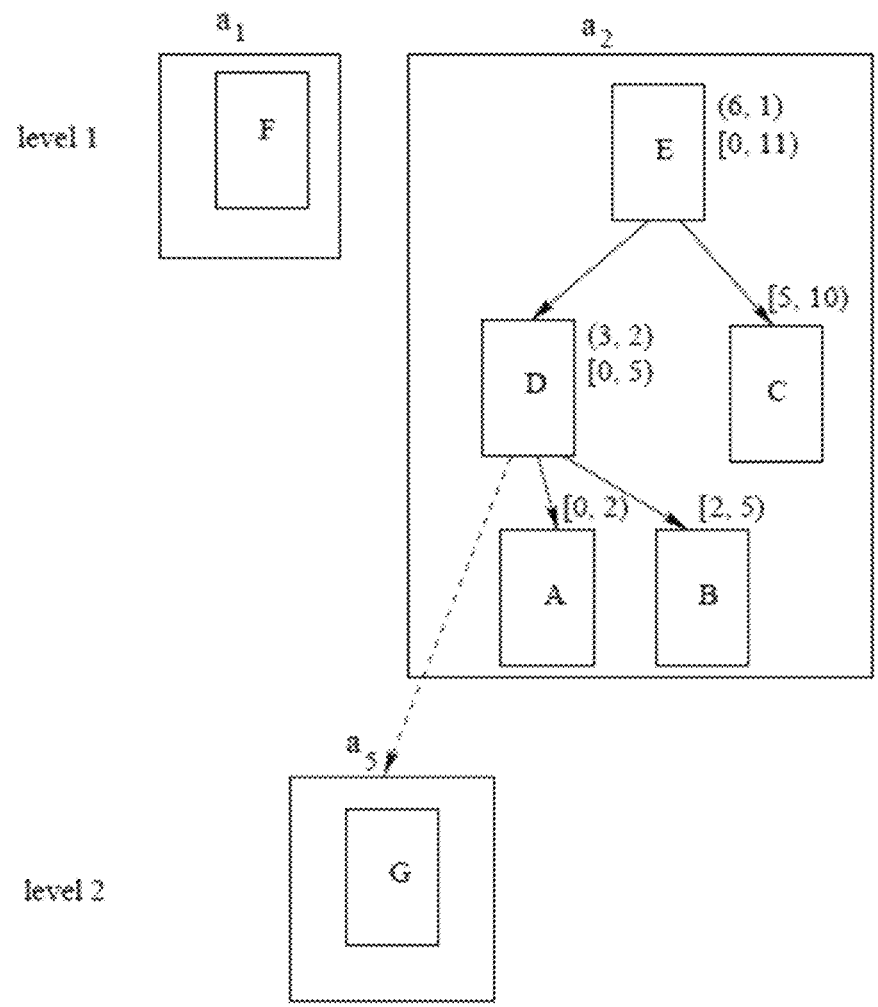
FIG. 6 illustrates fields in an RPST bucket of an embodiment of the invention.
FIG. 7 is an illustration of an attribute structure with D=RPST for attribute $a_2$ of an embodiment of the invention.

FIG. 6 gives the fields in an RPST bucket. mySubscriptionArray holds the subscriptions stored in the bucket and myLeftChild and myRightChild are pointers to the to the left and right RPST children, respectively. (myX, myY) is the bucket key. The pointers from a bucket to its next level associated attribute structures (shown in FIG. 7 by dashed arrows) are maintained in a global hash table using the address of the bucket and the attribute of the next-level attribute structure as hash key and the address of the address of the next-level attribute structures as hash data. So, a bucket does not need fields to access its associated attribute structures.

Each RPST bucket has an interval associated with it. The interval associated with the root bucket of the RPST begins at the minimum value permissible for the attribute a for which the RPST is defined and ends at the maximum value. The interval associated with a non-root bucket is obtained by bisecting the interval associated with its parent bucket. Supposing that the interval associated with some bucket is [N1, N2), then all keys in the subtree rooted at this bucket have an x value between N1 and N2. The intervals associated with the left and right children are [N1, (N1+N2)/2) and [(N1+N2)/2,N2), respectively. Each non-leaf bucket has a key (myX, myY) and all subscriptions stored in this non-leaf bucket have the predicate myY≤a≤myX. Leaf buckets do not have keys and the stored subscriptions have varied ranges on attribute a. (The keys are redundant as they may be determined from one of the subscriptions in the bucket, but the keys are useful to describe the RPST structure.) The keys in non-leaf buckets are positioned so that the non-leaf buckets define a minimum tree on myY. Consider a non-leaf bucket with key (myX, myY) and associated interval (l, r). The subscriptions in the left subtree of this bucket have predicates on a that are of the form low≤a≤high, where l≤low and high<(l+r)/2 while those in the right subtree have (l+r)/2≤low and high<r.

As an example, FIG. 7 shows three RPST attribute structures. These are on attributes $a_1$, $a_2$, and $a_5$, respectively. The buckets are labeled from A-H. The RPST for the attribute $a_2$ consists of buckets A-E (buckets A, B, and C are leaf buckets while buckets D and E are non-leaf buckets). E is the root bucket of this RPST. F and G are the root buckets of the RPSTs for $a_1$ and $a_5$, respectively. Both buckets are leaves. The attributes on the path from the header to bucket G, are $a_2$ and $a_5$. Therefore, the subscriptions in bucket G contain both these attributes. All subscriptions in F contain a predicate on attribute a1 and a11 in the buckets A through E have a predicate on $a_2$.

Suppose that $a_2$ is integer valued and from the domain [0,11). The interval associated with the root E is [0,11) and the intervals for buckets A, B, C, and D are, respectively, [0,2), [2,5), [5,11), and [0,5). Bucket E has the key (6,1), which implies that all subscriptions in this RPST have a y value≥1. The key in D (3,2). The remaining buckets are leaves and have no key. Notice that the y values of the keys in the non-leaf buckets satisfy the minimum tree requirement that descendants have a value no less than that of their ancestors. This property follows through for the subscriptions in buckets. The key in each non-leaf has the smallest y of all subscription keys in that subtree.

In the example, all subscriptions in bucket E have the predicate $1 \leq a_2 \leq 6$ while those in the bucket D and the attribute structure a5 have the predicate $2 \leq a_2 \leq 3$. The $a_2$ predicates in bucket C are of the form low≤$a_2$≤high, where low≥1 (minimum tree requirement) and 5≤high<11; for bucket A, low≥2 and 0≤high<2 (so, A must be empty); and for bucket B, low≥2 and 2≤high<5. All subscriptions with key (6,1) must be added to E. Remaining subscriptions with x value in [0, 5) must be added to the left subtree of E while those with x value in [5, 11) must be added to the right subtree of E.

Standard RPST usage requires that the domain of the first coordinate of the keys (x, y) stored in the tree be distinct and discrete and the domain range be known at the time the RPST is initialized. Since, in most applications (including a publish/subscribe system of an embodiment of the invention), to apply Standard RPST the first coordinates are not necessarily distinct (though they may be form a discrete domain with known range), the first coordinates are transformed using the equation myX=xN+y, where N represents the domain cardinality of attribute a. Now, all (transformed) first coordinates (i.e., myX values) are distinct. This transformation is unnecessary in a publish/subscribe system of an embodiment of the invention as the pub/sub system uses buckets with capacity greater than 1 and so is able to handle keys with the same x value. Further, the restriction to discrete valued attributes also may be removed and interval partitioning continued until the size of an interval reaches some threshold or until all keys in a bucket are the same. However, the requirement that the domain range be known in advance cannot be removed as this information is used to define the intervals associated with RPST buckets.

Embodiments expand upon the generic procedure for RPST described by McCreight in "Priority Search Trees." FIG. 8 shows an example algorithm to insert a subscription in a RPST node. First, note that in this application, an RPST cannot be empty. To insert, a path from the root bucket downward is followed. Upon arrival at a non-leaf bucket b, the insert key is compared with the key in b. If they value of the insert key is less than they value of b's key, a new non-leaf bucket q with the insert key and new subscription is created. q replaces b in the RPST and inherits its children. The subscriptions in b all have the same key and this bucket is inserted recursively into the appropriate subtree of q. Otherwise, if the insert key equals the key in b, the new subscription is added to b unless b is full. When b is full, the strategy described in FIG. 3 is used to create a next-level attribute structure for b. If the insert key is not equal to the key in b, the insert proceeds to the appropriate child of b. If a leaf bucket b is reached that has space for another subscription, the new subscription is added to b. When there is not sufficient space, the subscription (from those in b and the new subscription) is selected with least y and a non-leaf bucket q is created with this key. All subscriptions, with key equal to that of q are stored in q and the remaining subscriptions stored in newly created leaf buckets that are the children of q. In case such a split is not possible (because all subscriptions have the same key), the strategy of FIG. 3 is used to create a next-level attribute structure.

To search for all subscriptions that match an event e for which the attribute on which the PST is defined has value v, the initial step commences at the root bucket of the PST (FIG. 9). If at a bucket b and if b is a leaf bucket, the bucket search procedure is used to find all subscriptions in b that match the event e and then all attribute structures associated with b are searched. If b is a non-leaf bucket, v is compared with the y value, myY, of b. If v<myY, no subscription in the subtree rooted at b matches (as for all of these the predicate on the PST attribute is false) and the search is complete. When v≥myY all subscriptions in b are examined as are the attribute structures associated with b. In addition, let [l, r) be the interval associated with b, the left subtree is searched when v<(l+r)/2 and the right subtree searched otherwise.

a.ii) Red-Black Priority Search Trees (RBPST):

An RBPST overcomes a primary deficiency of the RPST—the cardinality of the domain must be known at the time the RPST is initialized. RBPSTs place no restriction on the domain or the keys. Using an RBPST, exact match searches, inserts, and deletes can be conducted in O(log n) time and rectangle searches can be conducted in O(s+log n) time, where n is the number of points in the RBPST.

In one embodiment, a pub/sub system is provided that uses a modified version of the RBPST implementation used in H. Lu and S. Sahni, O(log n) Dynamic Router-Tables for Prefixes and Ranges, *IEEE Transactions of Computers* Vol. 53, No. 10, 2004, 1217-1230. In one such implementation, when the total number of subscriptions in the RBPST is at most the bucket size, the subscriptions are stored in a single bucket. When the number of subscriptions exceeds the bucket size, the subscriptions are moved to a tree (the redblack priority search tree) with more than 1 bucket (unless, of course, all keys are the same and new attribute structures are being created as described in FIG. 3). All buckets in an RBPST with more than 1 node have a key that is common to all subscriptions stored in that node (this is similar to what happens in non-leaf buckets of an RPST). In addition, buckets have a second key (splitX, split)) that is called the split key. This split key is used to perform the RBPST operations. When the size of a bucket is exceeded, new attribute structures associated with that bucket are created as described in FIG. 3.

b) Interval trees: An interval tree (IT) is a binary tree that stores intervals of the form [l, r], l≤r. Like the RPST, the permissible range [L, R) for interval end points are known when an IT is initialized. Each bucket of an interval tree implicitly corresponds to a subrange of [L, R). This subrange is called the bucket interval and it is determined using the same rule as used for RPSTs. That is, root interval is [L, R). The interval for its left child is [L, (L+R)/2) and that for its right child is [(L+R)/2, R). The interval for descendent buckets is half that of parent buckets. With each bucket, a split value split is associated (implicitly) with the median value of the bucket interval. So, the split value for the root bucket is (L+R)/2. The root bucket stores intervals that include its split value; the remaining intervals are stored (recursively) in either the left or right subtree of the root; intervals that lie wholly to the left of the spilt value are stored in the left subtree while those that lie wholly to the right of the split value (i.e., all remaining intervals) are stored in the right subtree. In addition to storing intervals, each bucket has two lists leftList and rightList, which, respectively, store the left and right end points of the intervals stored in the bucket. Depending on the application, these lists may be sorted arrays, priority queues, balanced search trees, and so on. The algorithms to search, insert, and delete are fairly straightforward and may be found in D. Mehta and S. Sahni, Handbook of Data Structures and Applications, *Chapman & Hall/CRC*, 2005, for example.

In one embodiment of the subject pub/sub system comprising interval trees, the end-point lists leftList and rightList are stored as sorted arrays as this representation optimizes event processing. With this representation of end-point lists, the intervals that contain the point v may be found in O(s+log K) time, where K is the cardinality of the range [L, R). When the number of subscriptions to be stored in an IT bucket exceeds the bucket size, attribute structures are associated with the bucket as described in FIG. 3.

C. Predicates

One embodiment of the pub/sub system is provided herein. The pub/sub system supports the following types of predicates. This embodiment of the pub/sub system handles range predicates in the context of RPSTs and RBPSTs, which differs from how BETree handles these predicates. The strategy to handle the remaining predicate types is the same as that used in M. Sadoghi and H.-A. Jacobsen, BE-Tree: An Index Structure to Efficiently Match Boolean Expressions over High-dimensional Discrete Space, *SIGMOD* 2011.

1) Range: The range predicate low≤a≤high is mapped to the point (high, low) when using RPSTs and RBPSTs and to the interval [low, high] when using an IT.

2) Equality: The predicate a=v is equivalent to the range predicate v≤a≤v and the corresponding range strategy is used.

3) Inequality: The predicate a≠v is handled using the predicate L_a_R, where [L, R] is the range of the attribute a. A postprocessing step eliminates these subscriptions when the event has a=v.

4) ≤Operator: The predicate a≤v is equivalent to the range L≤a≤v, where L is the left end of the attribute range. Other relational operators such as ≥, <, and > are similarly cast into ranges and the corresponding range strategy is used (possibly followed by a postprocessing step for operators such as < and >.

5) Member of: The predicate a∈{$v_1$, . . . , $v_k$}, $v_1$<$v_2$< . . . <$v_k$, is mapped to the range $v_1$≤a≤$v_k$. A postprocessing step eliminates these subscriptions when the event specifies an a value is not one of the $v_i$s.

6) Not a Member of: a∉{$v_1$, . . . , $v_k$} is mapped to the range predicate L≤a≤R and a postprocessing step eliminates subscriptions when the event specifies an a value is one of the $v_i$s.

As mentioned earlier, the pub/sub system of the subject application is easily expanded to support additional attribute types (e.g., string) and operators (e.g., substring, suffix, prefix).

D. Comparison with BE-Tree

BE-Tree and the pub/sub system of the subject application have many similarities. For example both use clustering on a set of subscriptions that have a common attribute. This is a standard approach for multidimensional data with common attributes and has been used earlier in range trees (J. L. Bentley, Decomposable searching problems, *Information*

*Processing Letters*, Volume 8, No. 5, 1979, 244-201) and multidimensional tries (W. Lu and S. Sahni, Efficient two-dimensional multibit tries for packet classification, *IEEE Transactions on Computers* Volume 58, No. 12, 2009, 1695-1709.), for example. Like BE-Tree, both range trees and multidimensional tries use the same clustering strategy at all levels and for all attributes (range trees use the median attribute value while multidimensional tries use a bit of the attribute to cluster). However, unlike the BE-Tree, the subject pub/sub system allows for a heterogeneous selection of clustering strategies (i.e., the data structure D). Both BE-Tree and the publish/subscribe system of an embodiment of the invention partition a set of subscriptions into subsets that have a common attribute so that clustering may be applied to these subsets. BE-Tree selects the partitioning attribute by analyzing the subscriptions in the bucket to be partitioned while, in contrast, the subject pub/sub system performs this function this using a pre-specified attribute ordering.

Besides superior performance (see Examples herein), the subject pub/sub system offers the following advantages relative to BE-Tree:

1) BE-Tree uses the same clustering strategy for all attributes resulting in a homogeneous system. The subject pub/sub system, which is a heterogeneous system, offers a variety of data structures to keep track of the buckets in an attribute structure enabling the user to select data structures best suited for each attribute.

2) The clustering strategy employed in BE-Tree limits one to attributes whose values are discrete and for which the range of values is known in advance (i.e., at the time the attribute is created). So, for example, a nonnegative integer valued attribute can be used only if its maximum value is known in advance. Because of the heterogeneity in data structures for each attribute, the pub/sub system of the subject application permits all attribute data types. So, for example, the attribute data structure D to RBPST may be set for all attributes whose values are ordered (i.e., two attribute values may be compared to determine whether one is less than the other or whether both are equal), to RPST or IT for discrete valued attributes whose range is known in advance, to suffix tree or Aho-Corasick trie for attributes of string type, to a finite automaton for attributes that represent regular expressions, which can be easily added to the pub/sub system structure.

3) The clustering strategy employed in BE-Tree results in performance degradation when many subscriptions specify a range for the clustering attribute that spans the clustering criterion p. So, for example, if clustering on attribute 6 and using the criterion p=30, then all subscriptions with a predicate on attribute 6 that is satisfied by the value 30 are assigned to the same cluster. Suppose that many of these predicates are range predicates of the form $low_j \leq a_6 \leq high_j$. To determine which of these actually match the event value (say) 20, each of the $a_6$ ranges in the cluster must be examined. This takes time linear in the cluster size, which could be fairly large. The pub/sub system of the subject application overcomes this type of performance degradation by using data structures D that can quickly extract matching subscriptions even from large clusters.

General Implementation

Certain techniques set forth herein may be described in the general context of software or computer-executable instructions, such as program modules, executed by one or more computers or other devices. Generally, program modules include routines, programs, objects, components, and data structures that perform particular tasks or implement particular abstract data types. Certain methods and processes described herein can be embodied as code and/or data, which may be stored on one or more computer readable media. Certain embodiments of the invention contemplate the use of a machine in the form of a computer system within which software providing a set of instructions, when executed, can cause the system to perform any one or more of the methodologies discussed above.

In general, software may when loaded into a processing system and executed, transform a suitable apparatus system or device from a general-purpose computing system into a special-purpose computing system customized to improve publish/subscribe systems as described herein.

In some embodiments, the machine/computer system can operate as a standalone device. In some embodiments, the machine/computer system may include communication connections and devices that allow for communication with other computing systems over a communication network or collection of networks. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. In certain of such embodiments, the machine/computer system may operate in the capacity of a server or a client user machine in server-client user network environment, or as a peer machine in a peer-to-peer (or distributed) network environment.

The machine/computer system can be implemented as a desktop computer, a laptop computer, a tablet, a phone, a server, or any other machine capable of executing a set of instructions (sequential or otherwise) that specify actions to be taken by that machine, as well as multiple machines that individually or jointly execute a set (or multiple sets) of instructions to perform any one or more of the methods described herein.

The computer system can have hardware including one or more central processing units (CPUs) and/or digital signal processors (DSPs), memory, mass storage (e.g., hard drive, solid state drive), I/O devices (e.g., network interface, user input devices), and a display (e.g., touch screen, flat panel, liquid crystal display, solid state display). Elements of the computer system hardware can communicate with each other via a bus.

When a computer system reads and executes instructions that may be stored as code and/or data on a computer-readable medium, the computer system performs the methods and processes embodied as data structures and code stored within the computer-readable medium.

In accordance with embodiments of the invention, computer-readable media can be any available computer-readable storage media or communication media that can be accessed by the computer system.

By way of example, and not limitation, communication media includes wired media such as a wired network or direct-wired connection, and wireless media such as acoustic, radio frequency (RF), infrared and other wireless media. Combinations of the any of the above should also be included within the scope of computer-readable media.

Computer-readable storage media include removable and non-removable structures/devices that can be used for storage of information, such as computer-readable instructions, data structures, program modules, and other data used by a computing system/environment. By way of example, and not limitation, a computer-readable storage medium may include volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data for use by a computer system. "Computer-readable storage media" should not be construed or interpreted to include any carrier waves or propagating signals.

Furthermore, the methods and processes described herein can be implemented in hardware modules. For example, the hardware modules can include, but are not limited to, application-specific integrated circuit (ASIC) chips, field programmable gate arrays (FPGAs), and other programmable logic devices now known or later developed. When the hardware modules are activated, the hardware modules perform the methods and processes included within the hardware modules.

EXAMPLES

The example implementations of the subject publish/subscribe system was implemented in C++ and supports, for D, the data structures interval tree (IT), radix priority search tree (RPST), and red-black priority search tree (RBPST). This embodiment is referred to in the example as "PUBSUB". For the experiments A-I and K, PUBSUB was required to use the same data structure D for every attribute structure. As mentioned earlier, users may specify which data structure D should be used for which attribute and, in general, the use of a heterogeneous set of data structures was expected. The terms PS-IT, PS-RPST, and PS-RBPST refer to an embodiment of the invention with all data structures D set to IT, RPST, and RBPST, respectively.

For the following experiments, the code was compiled on a 64 bit Linux box with a 1.2 GHz CPU. The performance of PUBSUB was benchmarked against the pub/sub systems BE-Tree (Jul. 28, 2012 release; it should be noted that faster times have been released for newer versions) and Siena. The following experiments, like those of Sadoghi and Jacobsen, are for an application environment where the event rate far exceeds the rate at which subscriptions are inserted/deleted. Hence the focus is on event processing time. As a result, the experiments first initialize the subscription database and then measure the time needed to process events. For the application environment considered in this section, Sadoghi and Jacobsen have established the superiority of BE-Tree over other Pub/sub systems such as k-index, Propagation, Gryphon, SIFT, and SCAN. So, these other systems were not included in the experiments.

The test data (synthetic as well as real) for the experiments were generated using BEGen and the experiments were modeled after those reported by Sadoghi and Jacobsen. Two kinds of distributions were used, namely, uniform and Zipf, for selecting the predicates of a subscription.

For the experiments, the attributes in a subscription were ordered based on the frequency of occurrence of the attributes in the entire set of subscriptions in the system. The ordering was from the least frequent attribute to the most frequent one. This ordering improved PUBSUB performance, particularly for tests on Zipf distribution.

A first experiment (Section A below) to determine an appropriate bucket size for PUBSUB. This experiment was followed by several experiments to compare the event processing performance of PS-IT, PS-RPST, PS-RBPST, BE-Tree, and Siena. The various parameters used to generate the test data used in each of sections B through K are shown in FIG. 10. The parameters are those supported by BEGen and have the following meaning:

Number of Dimensions: The total number of attributes in the system.

Dimension Cardinality: The number of values each attribute can assume in the system.

Average Sub Size: Average number of attributes in a subscription

Average Event Size: Average number of attributes in an event

Predicate Average Range %: Average of the range of values that an attribute can assume in a subscription; expressed as percentage of the whole range of possible values, or dimension cardinality for that attribute.

% Equality Predicates: Total number of predicates in the subscription that involve the equality operator.

Operator Class: There are three operator classes that have different levels of expressiveness. The first operator class has a "low" level of expressiveness and contains operators = and ∈. The second class has a "medium" level of expressiveness and contains operators =, ∈, ≤, ≥ and BETWEEN. The third operator class has a "high" level of expressiveness and contains operators ≠, ∉ in addition to those contained in the second class of "medium" level of expressiveness.

Matching Probability %: Probability that an event will match a subscription.

In the following, the reported event processing time is the average time (microseconds per event) to process an event. This does not include the time needed to process the subscriptions and create the data structure in which the subscriptions are stored (i.e., for example, the time to create the collection of attribute structures used by PUBSUB. Section K gives the time for this parsing and initial data structure construction as well as the total memory required by PUBSUB, BE-Tree, and Siena.

A. Determining Maximum Bucket Size

Figure 11A:
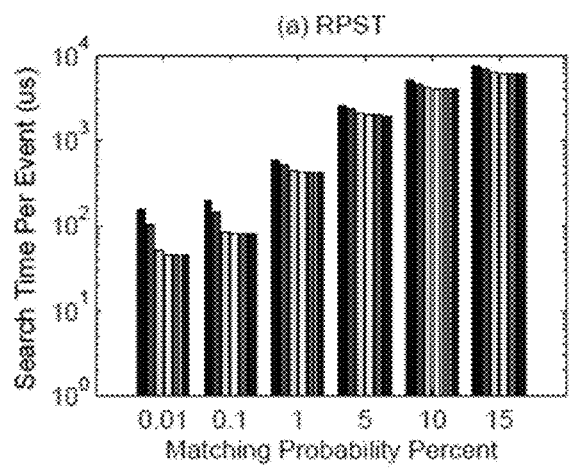
FIGS. 11(a)-(c) are graphical illustrations of search time results (microseconds/event) based on bucket size.
Figure 11B:
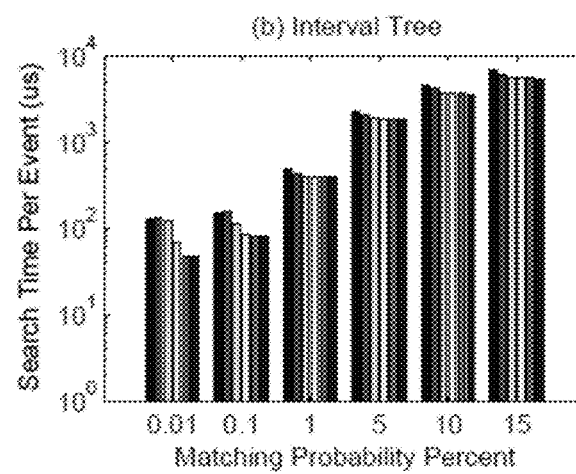
Figure 11C:
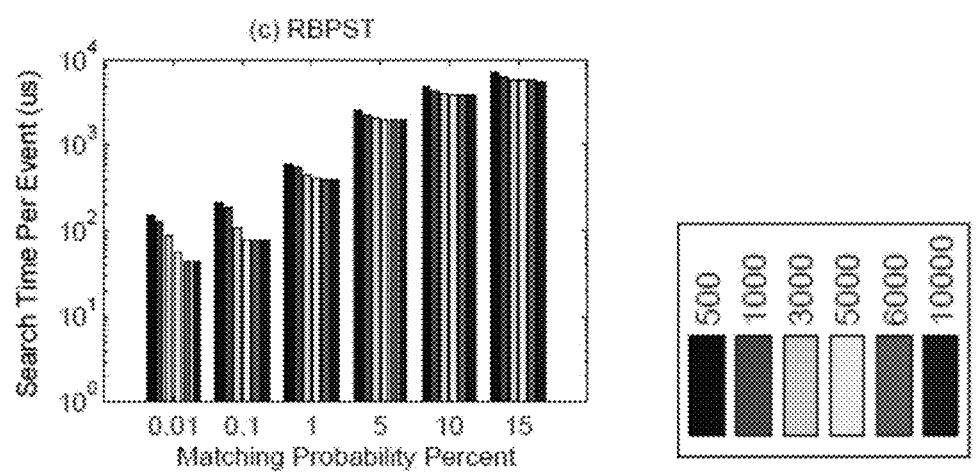

FIG. 11 shows how the event processing time varies with maximum bucket size and matching probability.

Bucket sizes≥5000 result in the best performance for the different matching probabilities as well as for all 3 choices of the data structure D. So, for the remaining experiments, the maximum bucket size was set to 5000. In application environments where the subscription insert/delete rate is not low, a smaller bucket size will, most likely, result in overall best performance.

B. How Search Time Varies with the Number of Subscriptions

Figures 12, 13:
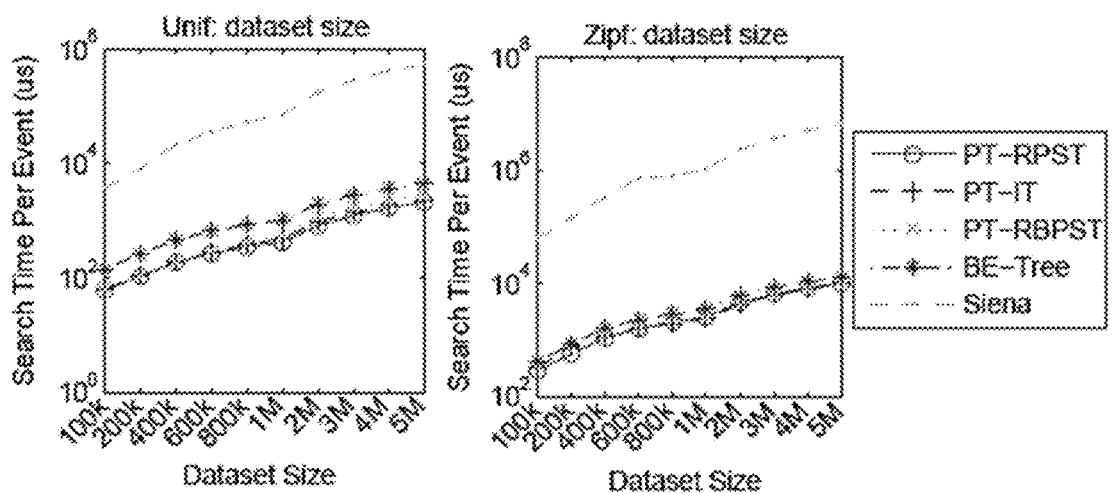
FIG. 12 is a table of results for varying sizes of datasets (microseconds/event).
FIG. 13 are graphical illustrations of search time results with varying dataset size (microseconds/event) as provided in FIG. 12.
Figures 14, 15:
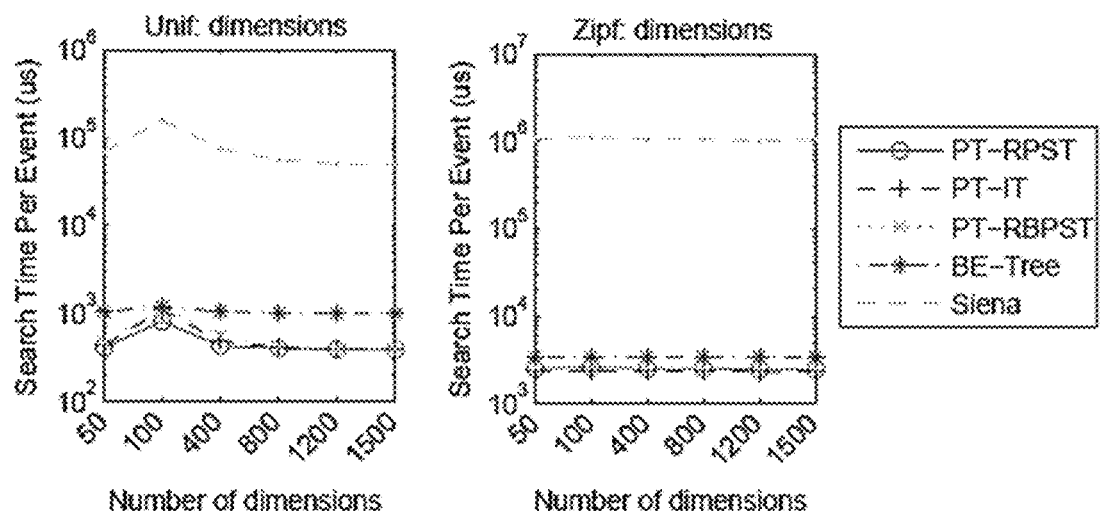
FIG. 14 is a table of results resulting from varying the number of dimensions (microseconds/event).
FIG. 15 are graphical illustrations of search time results with varying number of dimensions (microseconds/event) as provided in FIG. 14.

FIGS. 12 and 13 give the variation in event processing time as the number of subscriptions increased. For the uniform tests the reduction in event processing time using any of the 3 PUBSUB schemes compared to BE-Tree is between 52 to 87%, with the difference increasing with the number of subscriptions. The improvement in search time compared to Siena is between 91 to 94% for the uniform tests. The reduction for the Zipf tests is between 29 to 33% with respect to BE-Tree and between 98-99% with respect to Siena. The relative performance of the three PUBSUB schemes is comparable. The performance of PS-RBPST is slightly better than that of PB-RPST and PS-IT especially when the number of subscriptions exceeded a million and the degree of overlap between subscriptions is high (as in the Zipf tests). As the degree of overlap among subscriptions increases, more subscriptions occupy the same bucket and any differentiator applied on the subscriptions returns a larger number of subscriptions. This increases the overall search time as a larger number of subscriptions are examined to find a match.

C. How Search Time Varies with the Number of Dimensions (or Attributes) in the System All of the pub/sub systems being studied display the same trend in search time as the number of attributes is increased. The search time decreased slightly with an increase in the number of dimensions. As the dimensions in a system are increased, the degree of overlap among subscriptions tend to decrease if the size if the subscriptions remain the same. This translates into the observed reduction in search times. On the tests based on uniform distribution, PUBSUB was faster than BE-Tree by 33 to 61%, while on the Zipf tests it was faster by 31 to 33%. BE-Tree was faster than Siena.

D. How Search Time Varies with Dimension Cardinality

Figures 16, 17:
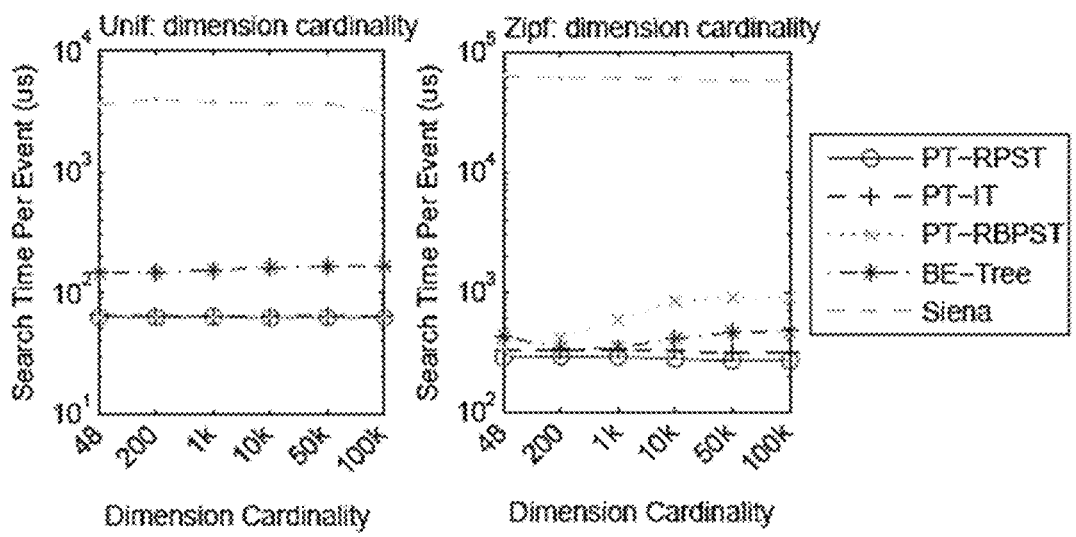
FIG. 16 is a table of results from varying the dimension cardinality (microseconds/event).
FIG. 17 are graphical illustrations of search time results with varying dimension cardinality (microseconds/event) as provided in FIG. 16.

FIGS. 16 and 17 give the search times for various cardinalities for tests based on uniform as well as Zipf distribution. With the exception of PS-RBPST for tests based on Zipf distribution, the search times remained more or less similar as dimension cardinality was changed. The performance of PSRBPST gets worse as cardinality increased in the Zipf case since deep RBPST trees are generated corresponding to the popular dimensions, making tree traversal time consuming. In other words, as dimension cardinality is increased for the popular dimensions, the intervals corresponding to a these dimensions become more and more unique. There is a RBPST node for each unique interval, which results in a large number of RBPST nodes and deep RBPST trees. By specifying bucket size to a larger value, one could restrict the number of buckets that undergo a RBPST split, resulting in smaller search time. For example, with a bucket size of 7000, the RBPST search time drops to 280 micro seconds for the 100K Zipf test.

PUBSUB was faster than BE-Tree by an amount between 57-63% on the tests based on uniform distribution, and between 14 to 43% on the tests based on Zipf. BE-Tree was faster than Siena.

E. How Search Time Varies with Predicate Selectivity

Figures 18, 19:
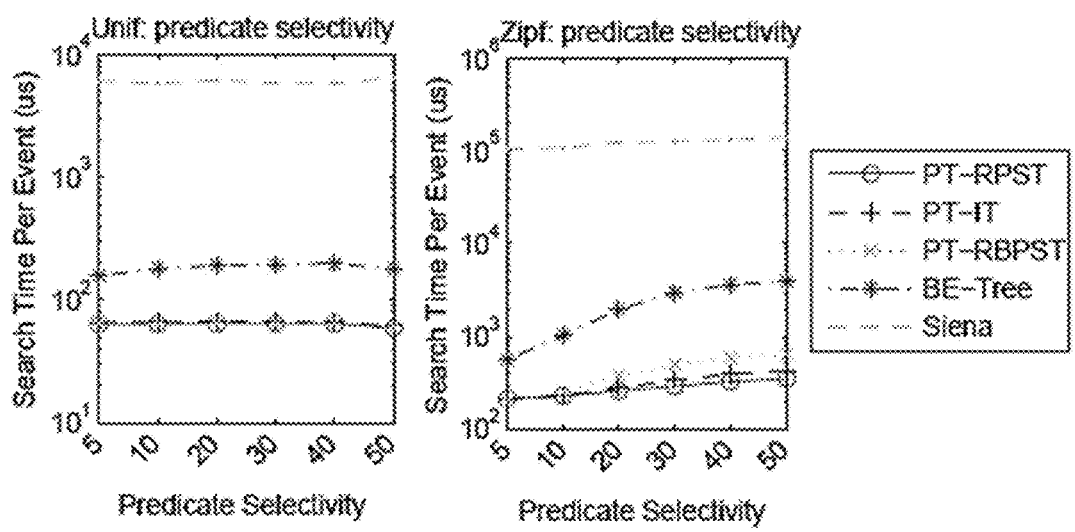
FIG. 18 is a table of results for varying predicate selectivity (microseconds/event).
FIG. 19 are graphical illustrations of search time results with varying predicate selectivity (microseconds/event) as provided by FIG. 18.

Predicate selectivity is a characteristic that is proportional to the ratio of dimension cardinality to predicate range size, where the dimension corresponds to the predicate. Thus, shorter the range of a predicate, higher is its selectivity. FIGS. 18 and 19 give us the search times for different predicate selectivity. Changing predicate selectivity did not impact tests based on uniform distribution. This is expected, since the subscriptions in these tests do not overlap much. So, changing the predicate range did not change the degree of overlap among the subscriptions. However, this is not true for the Zipf tests, which are highly overlapped to begin with. As predicate range size for the highly popular dimensions was increased, the degree of overlap increased further. For all pub/sub systems, search time increased with selectivity.

Figures 20, 21, 22:
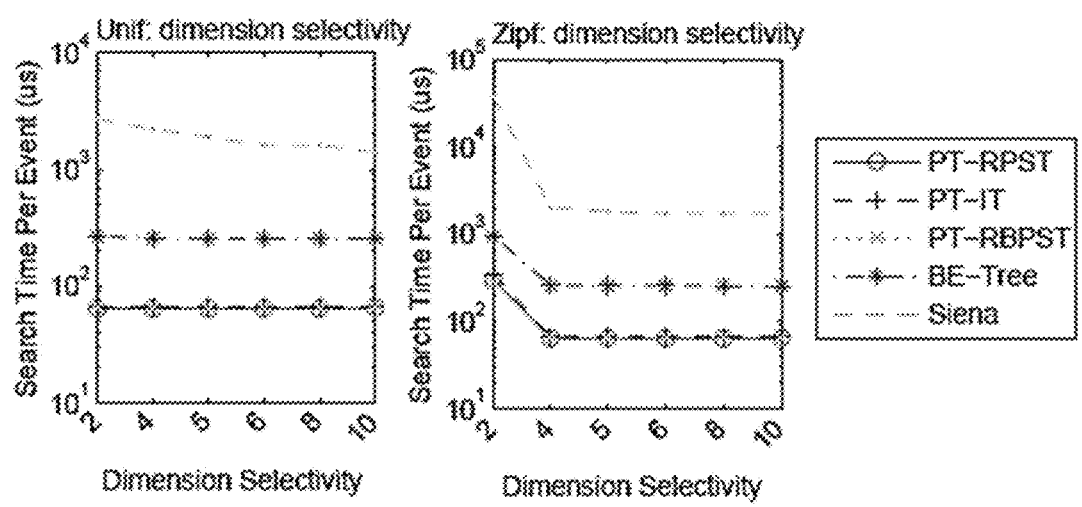
FIG. 20 is a table of results for varying sizes of datasets over a million, where subscriptions span middle point of attribute ranges (microseconds/event).
FIG. 21 is a table of results for varying dimension selectivity (microseconds/event).
FIG. 22 are graphical illustrations of search time results with varying dimension selectivity (microseconds/event) as provided in FIG. 21.

PUBSUB is faster than BE-Tree by 91% for the Zipf tests. This is a higher difference than what has been observed so far. To study this effect further, another set of experiments was performed, in which all the predicate ranges were made to span the middle point of the overall range for that dimension. These tests are based on uniform distribution, and were generated using a program that reads the subscription files of various sizes and outputs new subscription files with predicate ranges spanning the middle point. The results are given in FIG. 20. PUBSUB is faster than BE-Tree by 80% in these tests.

These tests highlight the deficiency in the space clustering technique of BE-Tree that results in accumulation of a large number of subscriptions in a single bucket that is exhaustively searched, resulting in a performance hit. PUBSUB has up to 10 times speed up compared to BE-Tree on these tests.

F. How Search Time Varies with Dimension Selectivity

Dimension selectivity is the percentage that a dimension is selected in building the predicates. For example, if there are two dimensions, then dimension selectivity is 50% under uniform selection. The variation of search times in minimal for all pub/sub systems. For Zipf tests with 2 dimensions, only one dimension is used more often. This results in a very high degree of overlap among the subscriptions and consequently very high search times for all the five algorithms. BE-Tree is faster than Siena, and PUBSUB is faster than BE-Tree for all the tests by an amount between 71-76%.

G. How Search Time Varies with Event and Subscription Sizes

Figures 23, 24:
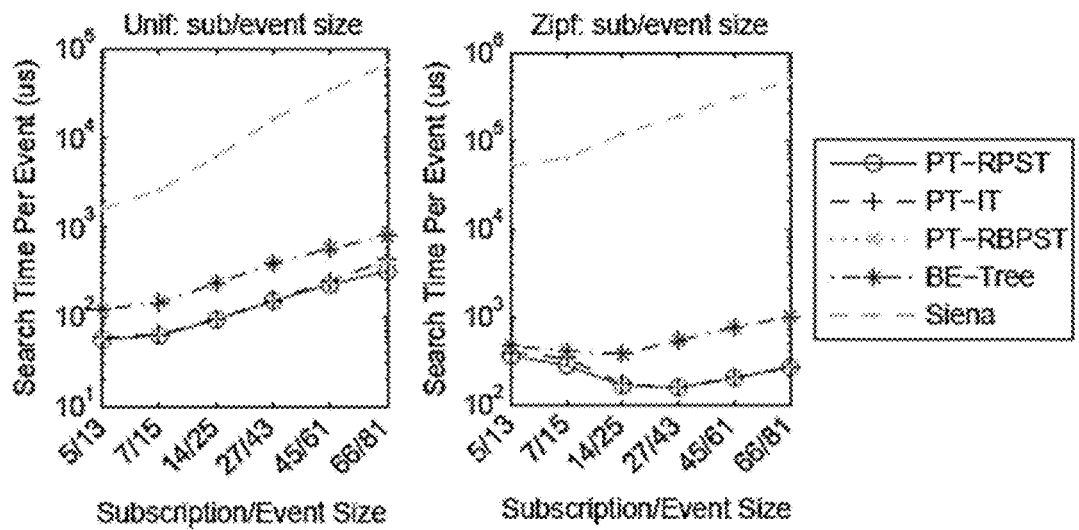
FIG. 23 is a table of results for varying dimension subscription/event sizes (microseconds/event).
FIG. 24 are graphical illustrations of search time results with varying subscription and event sizes (microseconds/event) as provided by FIG. 23.

FIGS. 23 and 24 show how search time varies with an increase in the number of predicates in subscriptions and events. Siena is highly sensitive to the number of predicates. BE-Tree and PUBSUB behave similarly with an increase in the number of predicates in subscriptions and events.

For the Zipf tests, the search time first decreases, and then increases. This is because, as the number of predicates in subscriptions is increased, some of the non-popular dimensions are included which results in a lower overlap among subscriptions. But as the number of predicates is increased further, this effect is nullified by the increase in time to match all the predicates. For BE-Tree, the search time starts to increase from 14/25, whereas, for PUBSUB, the search time on the Zipf tests starts to increase from 27/43.

For the uniform tests, the degree of overlap among subscriptions is small to start with and increasing the number of predicates do not change that in any significant way. Hence search time keeps increasing with the number of predicates for these tests.

BE-Tree is faster than Siena on all the tests. PUBSUB is faster than BE-Tree on the tests based on uniform distribution by a percent between 54-62%, and on those based on Zipf distribution, between 23-74%. On the uniform tests, the difference between search performance of PUBSUB and BE-Tree grew smaller with an increase in the number of predicates in the subscriptions and events.

H. How Search Time Varies with Percentage of Equality Predicates

Figures 25, 26:
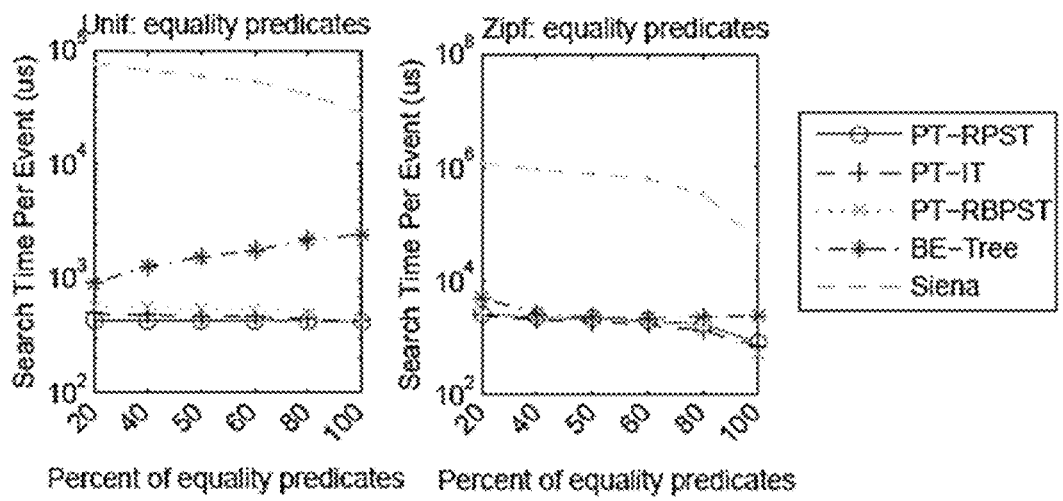
FIG. 25 is a table of results for varying dimension percentage of equality predicates (microseconds/event).
FIG. 26 are graphical illustrations of search time results with varying proportion of equality predicates (microseconds/event).
Figure 28:
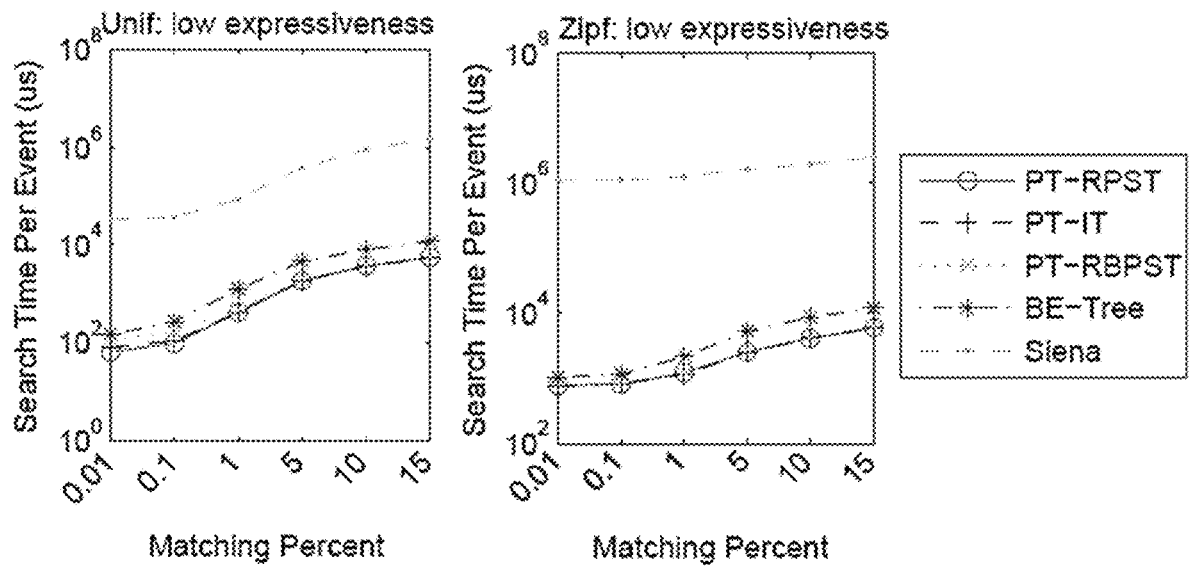
FIG. 28 are graphical illustrations of search time results with varying match probability for low expressiveness (microseconds/event).
Figure 29:
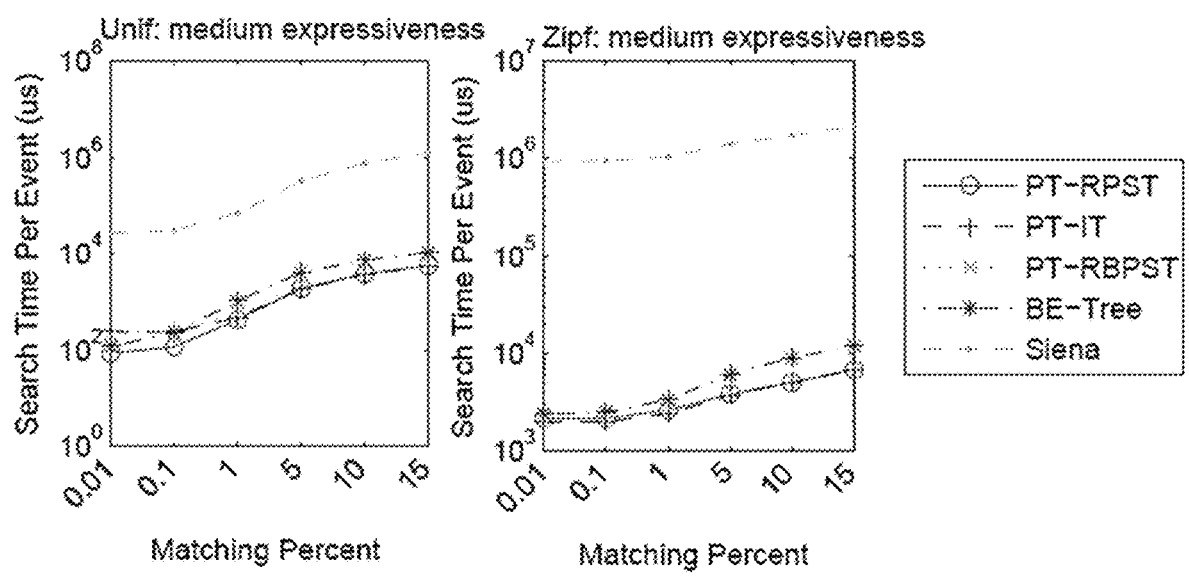
FIG. 29 are graphical illustrations of search time results with varying match probability for medium expressiveness (microseconds/event).

FIGS. 25 and 26 show the effect on search time as the percentage of equality predicates increase. As the percentage of equality predicates increase, search time decreases since the degree of overlap among subscriptions decreases.

PUBSUB is faster than BE-Tree by 53 to 83% for the tests on uniform distribution and by 17 to 78% for the tests on Zipf distribution. BE-Tree is faster than Siena on all the tests.

I. How Search Time Varies with Matching Probability and Expressiveness

In this set of tests, two parameters were varied. These are matching probability and expressiveness. A higher matching probability results in a larger number of matches found and, hence, higher search time. FIGS. 27 28, 29 and 30 show the changes in search time with changes in match probability percentage and expressiveness. All the five pub/sub systems show similar trends. Search time increases with match probability. Search time also increases with expressiveness, as expected.

PUBSUB is faster than BE-Tree by 26-85%, 18-59% and 32-60% on the tests in categories low, medium and high expressiveness, respectively. In some categories and for some matching percentages, PS-IT and PS-RBPST schemes are slower than BE-Tree. The performance of PS-IT and PSRBPST on these tests becomes better as larger buckets are used.

Overall from these runs it can be seen that that PS-RPST has a lower average search time than PS-IT and PS-RBPST.

J. Results Using a Heterogenous Set of Data Structures

Here two sets of experiments are provided that demonstrate the use of heterogeneous data structures. Both sets of experiments focus on using a heterogeneous set of data structures to improve performance on the Zipf data sets. In the first set of experiments, all attributes have integer values while in the second set some attributes are integer and the others are floating point.

J.1. Search Time Improvement

For the Zipf tests with a million or more subscriptions and medium to high operator a combination of data structures improves search time. The more frequently appearing attributes are stored in 4-way radix priority search trees, whereas the rest of the attributes are stored in binary interval trees. In particular, 4-way RPST is used for the top 13 of the most frequent attributes among the 400 attributes present in these tests.

Figures 30, 31:
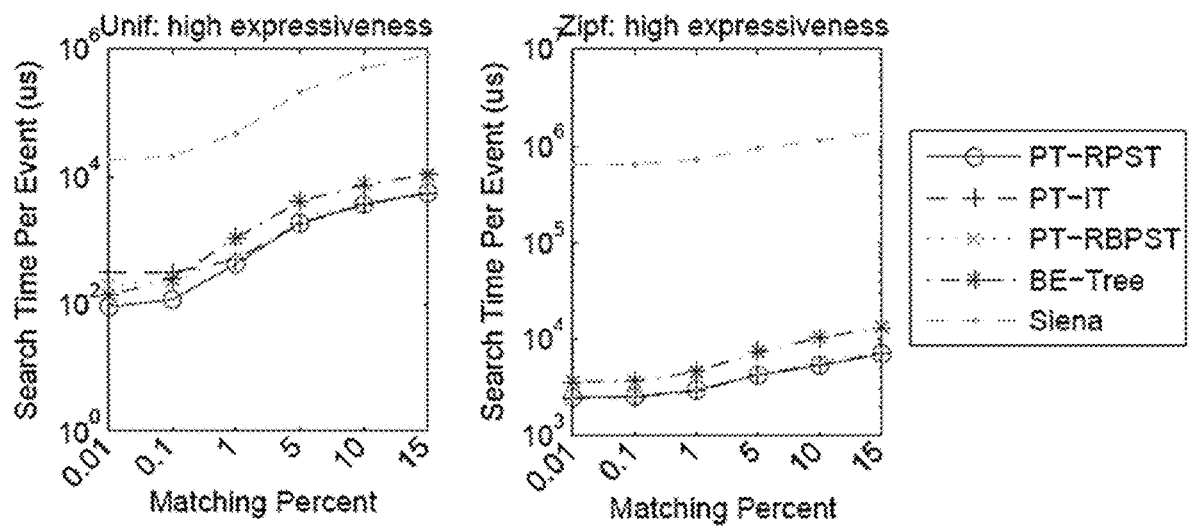
FIG. 30 are graphical illustrations of search time results with varying match probability for high expressiveness (microseconds/event).
FIG. 31 is a table of results for improvement when a heterogeneous set of data structures is used on varying sizes of datasets (microseconds/event).
Figures 32, 33:
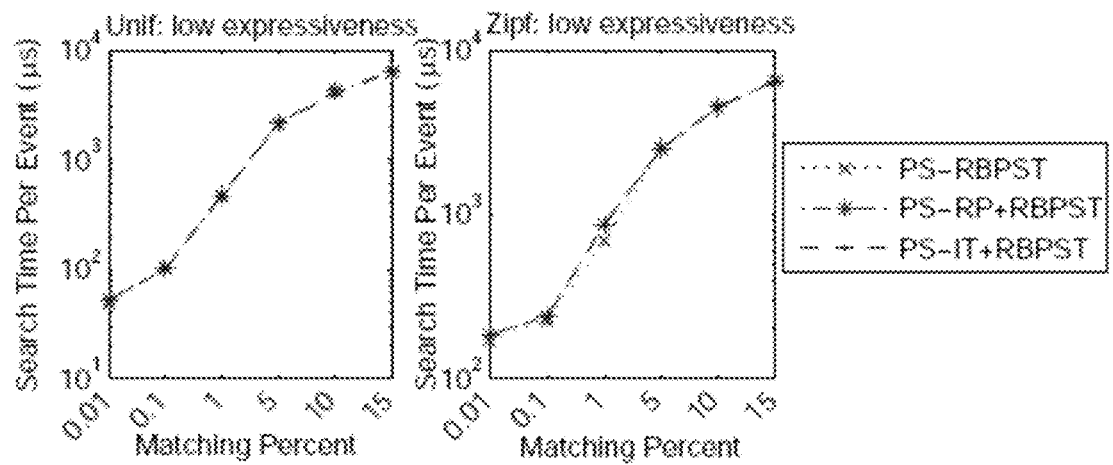
FIG. 32 is a table of results for improvement when a heterogeneous set of data structures is used on subscriptions with varying percentage of match probability and expressiveness (microseconds/event).
FIG. 33 are graphical illustrations of search time results with varying match probability for low expressiveness using a heterogeneous set of data structures (microseconds/event).

FIGS. 31 and 32 give the search times obtained using this combination in the column titled "PS-RPST4+IT". In FIG. 31, the improvement becomes more pronounced as the number of subscriptions increases, with 8.77% improvement relative to PS-IT for the test with 5M subscriptions. In FIG. 32, PS-RPST4+IT search time is up to 36% faster than that of PS-IT. The search times are faster because the tall binary ITs for the frequent attributes have been replaced by shorter, 4-way RPST. Using 4-way RPSTs for all the attributes is inefficient since most of the children nodes are NULL for the less frequent attributes.

J.2. Using a Mix of Attribute Types

To demonstrate the ability of PUBSUB to handle mixed attribute types, tests that use floating point and integer valued attributes are generated using BEGen, each test having 400 different attributes, out of which the first 200 attributes were set to be floating point and the next 200 were set to be integer. RBPST is used for the floating point attributes and RPST or IT for the integer ones, in these tests.

Figure 34:
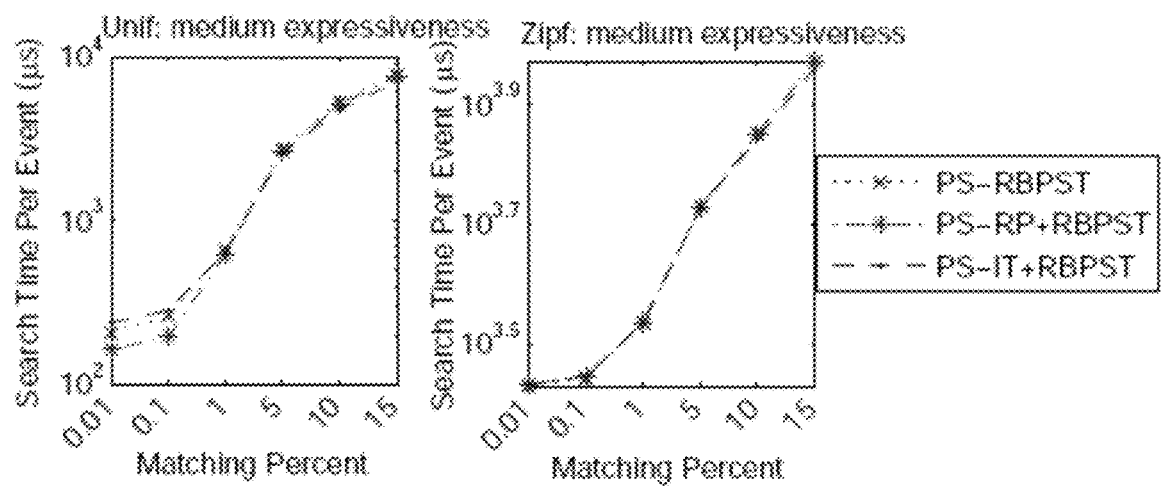
FIG. 34 are graphical illustrations of search time results with varying match probability for medium expressiveness using a heterogeneous set of data structures (microseconds/event).
Figure 35:
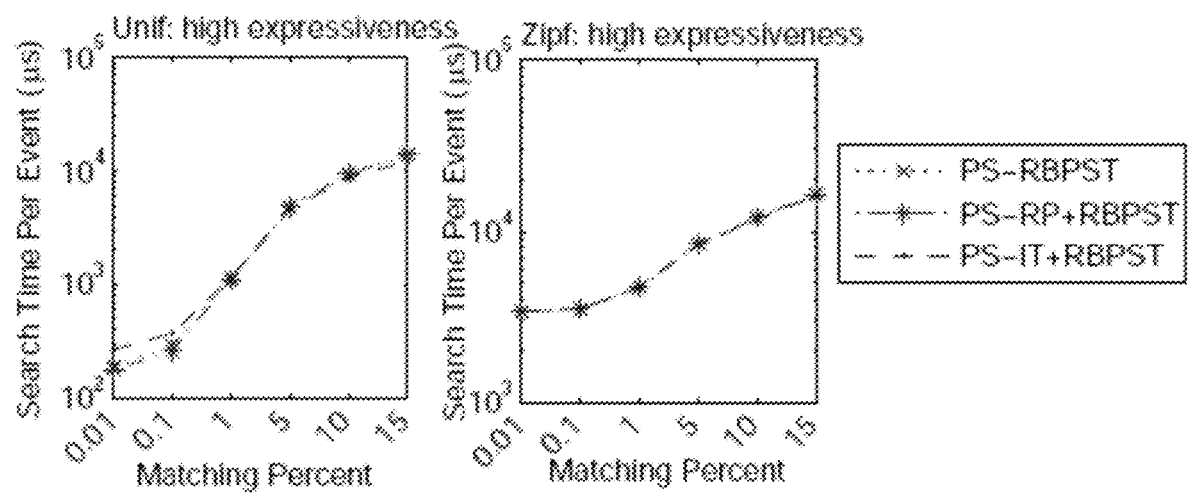
FIG. 35 are graphical illustrations of search time results with varying match probability for high expressiveness using a heterogeneous set of data structures (microseconds/event).

FIGS. 33-35 show a comparison of search times for PUBSUB with heterogeneous data structures. PS-RP+RBPST uses RPST, whereas PS-IT+RBPST uses IT for the integer attributes, while both use RBPST for the floating point attributes. The results are compared to PS-RBPST, where RBPST is used for both floating point and integer attributes. These graphs show that event matching is very fast when PUBSUB uses heterogeneous data structures and is comparable to the results obtained for the homogeneous PUBSUB performance when a single type of data structure was used for all the attributes. BE-tree was not used in the comparisons as BE-trees are unable to handle floating point attributes.

K. How Search Time Varies with the Number of Subscriptions on Real Datasets

Figures 36, 37, 38:
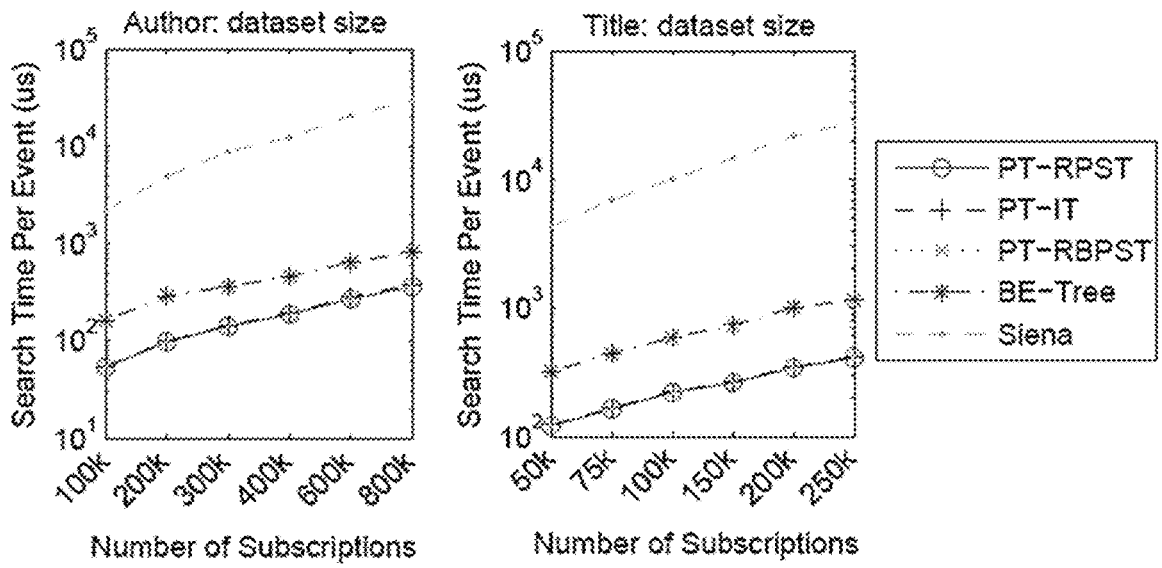
FIG. 36 is a table of results for varying number of subscriptions on real datasets (microseconds/event).
FIG. 37 are graphical illustrations of search time results on real datasets (microseconds/event).
FIG. 38 is a table of total runtime and memory consumption by different pub/sub systems.

FIGS. 36 and 37 show how search time varies with the number of subscriptions on real data sets. Search time increases with the number of subscriptions. PUBSUB is better than BE-Tree for the tests based on the author data by 56-67%. For the tests based on title, PUBSUB is better than BE-Tree by 62-66%.

L. Total Runtime and Memory Consumption

FIG. 38 gives the total time (time to parse the subscriptions, create the data structure for the subscriptions, and process 99 events) and the memory (space required by the program, data structure, and subscriptions; measured using VmSize) required by the pub/sub systems for four types of tests, each containing about a million subscriptions. For the tests based on uniform and Zipf distribution, the setup of Section B was used for 1M test, whereas for the Author and Title tests, the setup of Section K was used for the given number of subscriptions.

It is observed that Siena has the least memory consumption among all the systems. The total time and memory required by PUBSUB is relatively insensitive to whether RPSTs, RBPSTs, or ITs are used. PS-IT took more time to construct the subscription database than PT-RPST and PT-RBPST for the additional sorting of subscriptions in the left and right lists of buckets in an interval tree. Memory consumed by PT-RPST and PT-RBPST was lower than that of BE-Tree for all the tests. There is a significant improvement in total runtime compared to BE-Tree, for the synthetic tests based on uniform and Zipf distributions.

It should be noted that the majority of the time reported in FIG. 38 is the time to parse and create the data structure as only 99 events are processed. In an actual application, the structure is created once and a large number of events processed. So, the event processing time dominates the data structure construction time.

This particular embodiment of the invention is a versatile, scalable, and efficient publish/subscribe system. Although the implementation described in this Example includes only 3 choices (interval tree, radix priority search tree, and red black priority search tree) for the data structure D that is used to partition subscriptions based on the predicates of a single attribute, the set of available data structures for D is readily extended to include structures such as Aho-Corasick trees and suffix trees for string type attributes and operators, and finite automata for attributes representing regular expressions and related operators. The selection for the initial data structures was motivated by their suitability for predicates that specify a range of values.

The experiments compared the performance of PUBSUB with that of BE-Tree and Siena in an environment where event processing dominates subscription insert/delete. The same settings were used to generate the datasets as were used by Sadoghi and Jacobsen. Additionally, very large data sets containing over a million subscriptions were used. In general, there were three different types of datasets—those based on predicates selected from the attributes' pool using uniform distribution; those based on predicate selection using Zipf distribution, and finally those based on real data sets. PUBSUB performed significantly better than Siena and BE-Tree on these tests. On the tests, the speedup, in event processing, of the fastest version of PUBSUB relative to Siena ranged from a low of 22 to a high of 1827 and averaged 275. The speedup range relative to BE-Tree was from 1.16 to 11.26 and averaged 2.7. Siena's memory requirements are about a fourth of those of BE-Tree and PUBSUB. The memory required by the most memory efficient of PUBSUB's data structures was between 9% and 30% less that required by BE-Tree. With respect to data structure initialization, the three systems took a comparable amount of time on some data sets while on some PUBSUB could be initialized in $\frac{1}{5}$th time required to initialize Siena and $\frac{1}{14}$th that to initialize BE-Tree.

Although PS-IT and PS-RBPST were slower in event processing than BE-Tree on a few tests, the performance of PS-IT and PS-RBPST became better than that of BE-Tree on these tests when a larger bucket size was chosen. Among PS-IT, PS-RPST, and PS-RBPST, PSIT had the fastest average search time of 1337 microseconds, followed closely by PS-RPST and PS-RBPST with 1353 and 1424 microseconds respectively. For tests containing over a million subscriptions with a sufficient degree of overlap (as in the Zipf tests), PS-RBPST was the fastest. An added advantage of PS-RBPST is that it is not limited to attributes whose values come from a discrete finite domain whose range is known at the time the database is constructed. The memory overhead of PS-RPST, PS-IT and PS-RBPST are comparable. The time needed to initialize the subscription database was relatively high for PS-IT. The memory overhead and total runtime of PUBSUB is lower than that of BE-Tree for all the synthetic tests and for some of the real datasets based on author and title lists.

It should be emphasized that although these experiments used the same data structure for all attribute structures, it is expected that in real-world applications optimal performance will be achieved with a heterogeneous selection of data structures with interval trees being used in some attribute structures, red black priority search trees in others, and so on. The architecture of PUBSUB readily supports this heterogeneity.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A publish/subscribe system comprising:
a database storing subscriptions; and
a database manager that when executed by one or more processors directs the one or more processors to:
perform an update action with respect to a subscription to the database by:
using attributes of the subscription to follow a path in a heterogeneous hierarchical subscription data structure stored in the database until a lowest level is reached where the number of subscriptions does not exceed bucket capacity, wherein the attributes of the subscription are ordered from least occurring at a root of the data structure to most frequently occurring based on a frequency of occurrence of the attributes in the subscriptions in the database, wherein the heterogeneous hierarchical subscription data structure is configured to use different data structures for different attributes; and
performing the update action at an appropriate bucket of the database determined by the following of the path in the hierarchical subscription data structure; and
searching for one or more matching subscriptions for an event by:
using the hierarchical subscription data structure to determine which buckets of the subscription structure are to be searched; and
searching the buckets of the subscription structure which are to be searched for the one or more subscriptions that match the event.

2. The system according to claim 1, wherein performing the update action at the appropriate bucket comprises inserting or deleting the subscription into/from the appropriate bucket.

3. The system according to claim 1, for an attribute of a new subscription not used in the path in the hierarchical subscription data structure, the database manager, when executed by the one or more processors, directs the one or more processors to select an attribute data structure based on the subscription predicates that use this attribute.

4. The system according to claim 1, for reorganizing subscriptions in a bucket, when executed by the one or more processors, directs the one or more processors to: select a data structure for the attribute used to branch to the bucket by:
determining whether subscription predicates that use this attribute specify a range of values; a substring and/or suffix operators; an exact match; or string matching; and
in response to a determination that the attribute predicates specify the range of values, selecting a priority search tree or an interval tree;
in response to a determination that the attribute predicates specify the substring and/or suffix operators, selecting a suffix tree;
in response to a determination that the attribute predicates specify the exact match, selecting a red-black tree;
in response to a determination that the attribute predicates specify the string matching, selecting a suffix tree or an Aho-Corasick trie.

5. The system according to claim 4, wherein the database manager, when executed by the one or more processors, directs the one or more processors to select the data structure for the attribute of the subscription not used in the path further by:
determining whether subscription predicates that use this attribute specify an inequality; a membership in a set; or a non-membership in a set; and
in response to a determination that the attribute types of the subscription include the predicate specifying an inequality, the membership in a set, or the non-membership in a set, selecting a priority search tree.

6. The system according to claim 4, wherein the interval tree comprises end-point lists that are stored as sorted arrays.

7. The system according to claim 1, further comprising a single hash table stored on a computer-readable storage medium that tracks a plurality of subscription attribute structures stored in the database.

8. A computer-readable storage medium having instructions stored thereon that, when executed by a processor, perform a method comprising:
in response to receiving a request to perform an update action with respect to a subscription, performing the update action with respect to the subscription to the database by:
using attributes of the subscription to follow a path in a heterogeneous hierarchical subscription data structure stored in the database until a lowest level is reached, wherein the reached lowest level is a bucket, wherein the attributes of the subscription are ordered from least occurring at a root of the data structure to most frequently occurring based on a frequency of occurrence of the attributes in the subscriptions in the database, wherein the heterogeneous hierarchical subscription data structure is configured to use different data structures for different attributes; and performing the update action by first searching the reached bucket for the subscription that is to be updated and then updating it; and in response to receiving a request to process an event, searching for one or more matching subscriptions for the event by:

using the hierarchical subscription data structure to determine which buckets of the subscription structure are to be searched; and searching the buckets of the subscription structure which are to be searched for the one or more subscriptions that match the event.

9. The medium according to claim 8, wherein performing the update action at the appropriate bucket comprises inserting or deleting the subscription into/from the appropriate bucket.

10. The medium according to claim 8, wherein the method further comprises, for an attribute of a new subscription not used in the path in the hierarchical subscription data structure, selecting an attribute data structure based on the subscription predicates that use this attribute.

11. The medium according to claim 8, wherein the method further comprises, for reorganizing subscriptions in a bucket, selecting data structure for the attribute used to branch to the bucket by:

determining whether the subscription predicates that use this attribute specify a range of values; a substring and/or suffix operators; an exact match; or string matching; and in response to a determination that the attribute predicates specify the range of values, selecting a priority search tree or an interval tree;

in response to a determination that the attribute predicates specify the substring and/or suffix operators, selecting a suffix tree;

in response to a determination that the attribute predicates specify the exact match, selecting a red-black tree; and in response to a determination that the attribute predicates specify the string matching, selecting a suffix tree or an Aho-Corasick trie.

12. The medium according to claim 11, wherein selecting the data structure for the attribute of the subscription not used in the path further comprises:

determining whether the subscription predicates that use this attribute specify an inequality; a membership in a set; or a non-membership in a set; and in response to a determination that the attribute predicates specify an inequality, membership in a set, or non-membership in a set, selecting a priority search tree.

13. The medium according to claim 11, wherein when a domain cardinality of the predicate specifying the range of values is not known at a time of initialization, the selecting of the data structure for the attribute of the subscription not used in the path comprises:

selecting a red-black priority search tree data structure for the subscription.

14. The medium according to claim 11, wherein the interval tree comprises end-point lists that are stored as sorted arrays.

15. The medium according to claim 8, further comprising a single hash table stored on a computer-readable storage medium that tracks a plurality of subscription attribute structures stored in the database.

16. A method of selecting a data structure for an attribute of a subscription in a publish/subscribe system, the attribute comprising attribute predicates, the method comprising:

selecting, by a processor, a heterogeneous attribute data structure from a heterogeneous hierarchal data structure, based on subscription predicates that use the attribute, wherein attributes of the subscription are ordered from least occurring at a root of the data structure to most frequently occurring based on a frequency of occurrence of the attributes in the subscriptions in a database, thereby increasing the efficiency of the processor, and wherein the heterogeneous hierarchical subscription data structure is configured to use different data structures for different attributes.

17. The method according to claim 16, wherein selecting the attribute data structure based on the subscription predicates that use the attribute comprises:

determining whether the attribute predicates specify a range of values, an inequality, a membership in a set, a non-membership in a set, a substring and/or suffix operators, an exact match, or a string matching; and in response to a determination that the attribute predicates specify the range of values, selecting a priority search tree or an interval tree;

in response to a determination that the attribute predicates specify the inequality, the membership in the set, the non-membership in the set, selecting a priority search tree;

in response to a determination that the attribute predicates specify the substring and/or suffix operators, selecting a suffix tree;

in response to a determination that the attribute predicates specify the exact match, selecting a red-black tree;

in response to a determination that the attribute predicates specify the string matching, selecting a suffix tree or an Aho-Corasick trie.

18. The method according to claim 17, wherein the interval tree comprises end-point lists that are stored as sorted arrays.

19. The method according to claim 17, further comprising a single hash table stored on a computer-readable storage medium that tracks a plurality of subscription attribute structures stored in the database.

20. The system according to claim 1, wherein only non-empty attributes are stored in the database.

21. The medium according to claim 8, wherein only non-empty attributes are stored in the database.

22. The method according to claim 16, wherein only non-empty attributes are stored in the database.

23. The system according to claim 1, for an attribute of a new subscription used to branch out and store the subscription in a bucket in a path in the hierarchical subscription data structure, the database manager, when executed by the one or more processors, directs the one or more processors to check if the bucket storing subscriptions is full and if so, the existing subscriptions in the bucket are reorganized into a data structure which is selected based on this attribute, and then the new subscription is added appropriately to this newly organized data structure, in the database construction phase.

24. The system according to claim 1, for an attribute of a new subscription used to branch out and store the subscription in a bucket in a path in the hierarchical subscription data structure, the database manager, when executed by the one or more processors, directs the one or more processors to check if the bucket is full and if not, the new subscription is inserted in the bucket, in the database construction phase.

* * * * *